(12) United States Patent
Coussens et al.

(10) Patent No.: US 12,115,813 B2
(45) Date of Patent: Oct. 15, 2024

(54) APERTURED ARTICLE, INSERTION ARTICLE AND ASSOCIATED SYSTEMS

(71) Applicant: REV Robotics LLC, Carrollton, TX (US)

(72) Inventors: Nicholas James Coussens, Chicago, IL (US); Orion Christopher DeYoe, Irving, TX (US); Gregory Elliott Needel, Coppell, TX (US); David Aaron Yanoshak, Dallas, TX (US); Jonathan James Bryant, Boston, MA (US); Francisco Musiol Lima, Carrollton, TX (US)

(73) Assignee: REV Robotics LLC, Carrollton, TX (US)

( * ) Notice: Subject to any disclaimer, the term of this patent is extended or adjusted under 35 U.S.C. 154(b) by 0 days.

(21) Appl. No.: 17/721,244

(22) Filed: Apr. 14, 2022

(65) Prior Publication Data
US 2023/0331035 A1    Oct. 19, 2023

Related U.S. Application Data

(63) Continuation-in-part of application No. 29/834,696, filed on Apr. 13, 2022, and a continuation-in-part of
(Continued)

(51) Int. Cl.
*B60B 3/10* (2006.01)
*A63C 17/22* (2006.01)
(Continued)

(52) U.S. Cl.
CPC ............... *B60B 3/10* (2013.01); *A63C 17/22* (2013.01); *B60B 3/004* (2013.01); *B25J 5/007* (2013.01); *B60B 2900/116* (2013.01)

(58) Field of Classification Search
CPC ......... B60B 3/10; B60B 19/003; B60B 19/12; B60B 1/06; B60B 37/04; B60B 37/06;
(Continued)

(56) References Cited

U.S. PATENT DOCUMENTS

| | | | | | |
|---|---|---|---|---|---|
| 868,875 | A | * | 10/1907 | Latcher | B60B 17/0006 295/35 |
| 888,114 | A | * | 5/1908 | Numan | F16L 9/06 138/173 |

(Continued)

FOREIGN PATENT DOCUMENTS

| | | | | |
|---|---|---|---|---|
| EP | 3560729 A1 | * | 10/2019 | B60B 17/00 |
| JP | 60042101 A | * | 6/1985 | B60B 5/02 |

OTHER PUBLICATIONS

24 Best and Coolest Star Socket Sets for 2019; Posted in Power and Hand Tools by Admin on Dec. 5, 2019; https://www.hotpowerhandtools.com/24-best-and-coolest-star-socket-sets-for-2019/.

(Continued)

*Primary Examiner* — Jason R Bellinger
(74) *Attorney, Agent, or Firm* — Stephen Y. Liu; David W. Carstens; Carstens, Allen & Gourley, LLP

(57) ABSTRACT

An apertured article, insertion article and associated systems. The apertured article having an aperture, which has an aperture periphery, the aperture periphery having an aperture inner periphery and spaced aperture protrusions that extend radially outwardly from the aperture inner periphery to an aperture outer periphery. The aperture outer periphery is defined by distal edges of the spaced aperture protrusions. The aperture inner periphery is positioned along the circumference of an inner aperture reference circle, the inner aperture reference circle inscribing the aperture periphery, and the aperture outer periphery is positioned along the circumference of an outer aperture reference circle. As viewed along a radial line whose origin is at the center of the
(Continued)

inner aperture reference circle, the aperture inner periphery can be positioned along 0.4 to 0.6 of the entire circumference of the inner aperture reference circle. The insertion article can be configured for insertion in the apertured article.

15 Claims, 30 Drawing Sheets

Related U.S. Application Data application No. 29/834,698, filed on Apr. 13, 2022, and a continuation-in-part of application No. 29/834,695, filed on Apr. 13, 2022, and a continuation-in-part of application No. 29/834,697, filed on Apr. 13, 2022.

(51) Int. Cl.
  *B60B 3/00* (2006.01)
  *B25J 5/00* (2006.01)

(58) Field of Classification Search
  CPC ........... B60B 3/001; B60B 5/02; B60B 27/06; B60B 27/065; B60B 27/0015; B60B 27/0021; B60B 27/0026; B60B 35/12; B60B 35/121; B60B 35/14; B60B 35/025; B60B 35/04; A63C 17/22; F16L 7/00; F16L 9/006; F16L 9/06; F16L 9/19
  USPC .............................. 301/5.305, 111.02, 111.03
  See application file for complete search history.

(56) References Cited

U.S. PATENT DOCUMENTS

| | | | | |
|---|---|---|---|---|
| 910,192 | A * | 1/1909 | Grouvelle et al. | F28F 13/12 D25/120 |
| 2,472,742 | A * | 6/1949 | Brown | B60B 35/1081 411/277 |
| 2,495,952 | A * | 1/1950 | Allman | B60B 35/121 301/9.2 |
| 2,569,590 | A * | 10/1951 | Van Schoyck | B60B 27/065 301/128 |
| 2,835,275 | A * | 5/1958 | Scholten | B21D 15/02 138/173 |
| 3,782,751 | A * | 1/1974 | Williams | B60B 37/04 280/220 |
| 4,424,047 | A * | 1/1984 | Welschof | B60B 27/0005 464/145 |
| 4,472,156 | A * | 9/1984 | Orain | F16D 3/2055 464/111 |
| 4,832,637 | A * | 5/1989 | Goluba | B63H 20/32 403/360 |
| 5,158,389 | A * | 10/1992 | Osterwald | E06C 7/085 29/523 |
| D404,000 | S | 1/1999 | Melbinger | |
| 5,964,008 | A * | 10/1999 | Lim | A47L 9/009 301/111.02 |
| 6,368,223 | B1 * | 4/2002 | Ouchi | F16C 43/04 464/145 |
| 6,450,585 | B1 * | 9/2002 | Kochsiek | B60B 27/0036 301/124.1 |
| 6,550,975 | B2 * | 4/2003 | Inoue | B60B 27/0005 384/537 |
| 6,551,190 | B2 * | 4/2003 | Hofmann | B60B 27/0042 464/145 |
| 6,692,157 | B2 * | 2/2004 | Sahashi | F16D 3/223 384/537 |
| D499,061 | S | 11/2004 | Echazabal | |
| D535,239 | S | 1/2007 | Hovind et al. | |
| 7,231,949 | B2 * | 6/2007 | Tuggle | B60C 15/0233 301/95.101 |
| 7,249,528 | B2 * | 7/2007 | Inoue | B60B 27/0042 73/862.392 |
| D569,778 | S | 5/2008 | Kim | |
| D782,383 | S | 3/2017 | Owens et al. | |
| 9,623,702 | B2 * | 4/2017 | Fudemoto | B60C 7/24 |
| D789,861 | S | 6/2017 | Macey et al. | |
| D876,314 | S | 2/2020 | Han | |
| 10,563,693 | B2 * | 2/2020 | Sguotti | F16C 33/581 |
| D893,380 | S | 8/2020 | Vincent et al. | |
| D896,153 | S | 9/2020 | Hoste | |
| D899,998 | S | 10/2020 | Carbis et al. | |
| D917,368 | S | 4/2021 | Kaneko et al. | |
| D941,731 | S | 1/2022 | Podlovits | |
| D987,532 | S | 5/2023 | Kasper | |
| 2006/0145531 | A1 * | 7/2006 | Galvanin | B60B 27/065 301/105.1 |
| 2017/0058940 | A1 * | 3/2017 | Wehner | F16D 3/06 |
| 2018/0312001 | A1 * | 11/2018 | Holt | B60B 17/0006 |
| 2021/0114406 | A1 * | 4/2021 | Sutherland | B60B 19/003 |

OTHER PUBLICATIONS

3D ContentCentra—Free 3D CAD Models, 2D Drawings, and Supplier Catalogs; https://www.3dcontentcentral.com/parts/supplier/REV-Robotics/102733.aspx.

Auto Quarterly; Best Socket Sets to Expand Your Toolbox; Last Updated Mar. 19, 2021, Posted in Reviews, Tools; https://autoquarterly.com/best-socket-sets/.

Drive Shafts, Inc. "Argicultural Driveshafts", https://www.driveshaftsoftulsa.com/pages/agricultural-drive-shafts, accessed as least as early as Oct. 30, 2023, 7 pages.

MR Driveline, Star Tube, https://www.ujdriveshaft.com/product/star-tube/, accessed at least as early as Oct. 30, 2023 6 pages.

Pat's Driveline, "Agricultural PTO Shaft Tubing", https://patsdriveline.com/products-services/agricultural-products/pto-shaft-tubing/, accessed at least as early as Oct. 30, 2023, 6 pages.

PaulB Hardware, AW35, AW36, AW26 series star profile tube, clearanced for uncoated tube, https://paulbhardware.com/pto-outer-w2400-2500-inner-w2600-6007961, accessed at least as early as Oct. 30, 2023, 1 page.

Quality Farm Supply, PTO Repair Tubes and Shafts, https://qualityfarmsupply.com/collections/pto-repair-tubing-and-shafting, accessed at least as early as Oct. 30, 2023, 22 pages.

Sparex Agricultural Parts, PTO Tube—Star Profile, https://export.sparex.com/pto-tube-star-profile-length-1m-s5-24821.html, accessed at least as early as Oct. 30, 2023, 3 pages.

Tube MFG, Shaped Steel Tubes, https://www.tubemfg.com/product/other-products/Shaped-Steel-Tubes.html, accessed at least as early as Oct. 30, 2023, 3 pages.

Weasler Engineering, Inc., Star Profile Tube, https://www.weasler.com/product/star-profile-tube-2/, accessed at least as early as Oct. 30, 2023, 4 pages.

R10: 1-⅜" X 6 Splined Weld On Hub—Splined Sprocket Hub (Jun. 23, 2021), 1-⅜" X 6 Splined Weld On Hub—Splined Sprocket Hub (archive.org).†

R11: Lock Tab—Sprocket—Front—XS650, Mikes XS (Nov. 21, 2021), Lock Tab—Sprocket—Front—XS650 | Yamaha Motorcycle Parts | Mikes XS (archive.org).†

R12: KV13X16X35 Ametric Metric Spline Sleeve, Amazon (Feb. 18, 2014), https://www.amazon.com/KV13X16X35-Ametric%C2%AE-DIN-5463-Diameter/dp/B00IIUEG4K.†

R13: Ball Splines &Shaft—Splined Shafts And Hubs DIN ISO 14 (Mar. 5, 2021), Ball Splines &Shaft—Splined Shafts And Hubs DIN ISO 14 Distributor / Channel Partner from Chennai (archive.org).†

R14: Sparex 15073—Mitsubishi/Satoh Tractor PTO Adaptor, Amazon (Nov. 6, 2013), Amazon.com: Sparex 15073—Mitsubishi/Satoh Tractor PTO Adaptor Fits early Mitsubishi, Satoh : Patio, Lawn &Garden.†

R15: Weasler Quick Disconnect Tractor Yoke, 6 Series NA, 1-⅜ in., 6 Spline, Tractor Supply Co. (Sep. 29, 2020), Weasler Quick Disconnect Tractor Yoke, 6 series NA, 1-⅜ in., 6 Spline at Tractor Supply Co. (archive.org).†

(56) References Cited

OTHER PUBLICATIONS

R16: When Should You Use a Ball Spline?, archive.org (May 24, 2019), When should you use a ball spline? (archive.org).†
R17: PTO Shaft, AX4 1-3/8 in. 6-Spline x 3/8 in. 6-Spline, archive.org (Sep. 20, 2017), PTO Shaft, AX4 1-3/8 in. 6-Spline x 1-3/8 in. 6-Spline (archive.org).†
R18: Spline Gages—Best Availability and Prices—In Stock Ready To Ship, Westport Corp. (Sep. 22, 2021), Spline Gages—Best Availability and Prices—In Stock Ready To Ship—WESTport Corp. (archive.org).†
R1: RAParts, PTO Sleeve Increaser Female Spline 1 1/8—6 x Male Spline 1 1/8 Fits Landini, Amazon (Apr. 6, 2021), https://www.amazon.com/Sleeve-Increaser-Female-Spline-Landini/dp/B091TBVJ9C/.†
R2: Star Shaped PTO Shaft Seamless Steel Tube, Youtube (2021), https://www.youtube.com/watch?v=pb3cmJWhum4.†
R3: Standard SAE Parallel Key Spline, Omnigear &Machine Corp., p. 12 (Aug. 6, 2020), OmniGear.Tech_.Info_.Binder.v2.pdf (secureservercdn.net).†
R4: ISO Involute Spline, Roy Mech (Oct. 25, 2020), https://web.archive.org/web/20201025072752/https:/roymech.org/Useful_Tables/Keyways/Splines_Inv.html.†
R5: Shafting Details Lecture 2020, Sharif University of Technology (Dec. 26, 2010), https://web.archive.org/web/20101226053524/https:/mech.sharif.edu/~durali/design/Shafting/details/Lecture%2020.pdf.†
R6: Splines—Design And Application (Inch Edition), Ansi Webstore (2020), https://webstore.ansi.org/standards/agma/agma945b20r2020.†
R7: Technologies Explained—Micro Spline | Shimano, Youtube (2020), https://www.youtube.com/watch?v=9ZhlI2OKXbY.†
R8: Splines, Ch 17, Machinery's Handbook, Industrial Press, NY (Aug. 7, 2019), https://www.scribd.com/document/421063912/SAEJ498c-pdf.†
R9: American Standard Parallel Splines, Omnigear &Machine Corp., pp. 73-74 (Aug. 6, 2020), OmniGear.Tech_.Info_.Binder.v2.pdf (secureservercdn.net).†

\* cited by examiner
† cited by third party

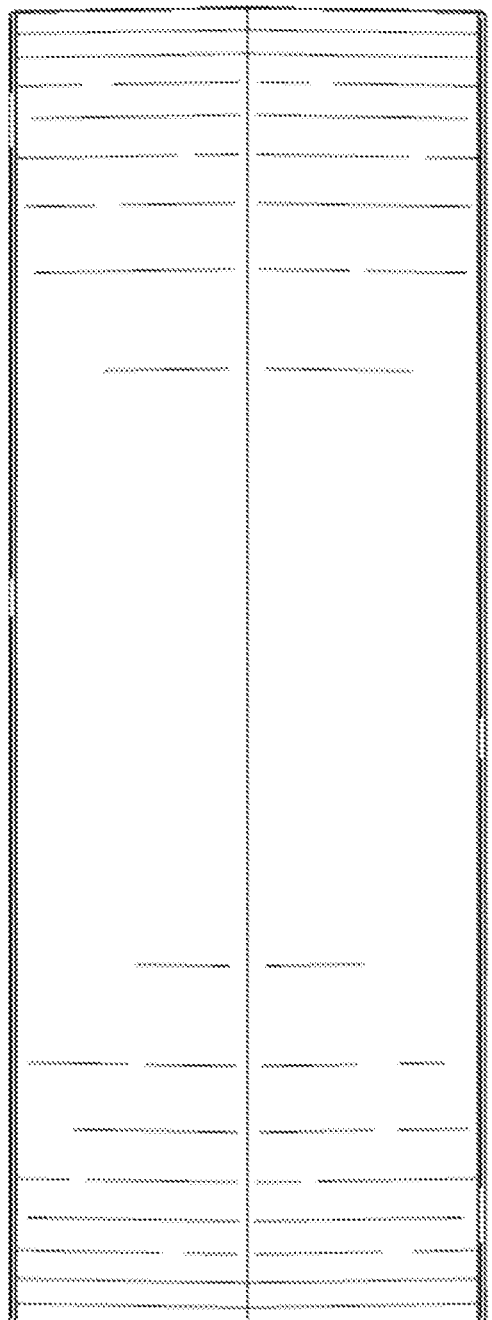
0100   FIG. 3
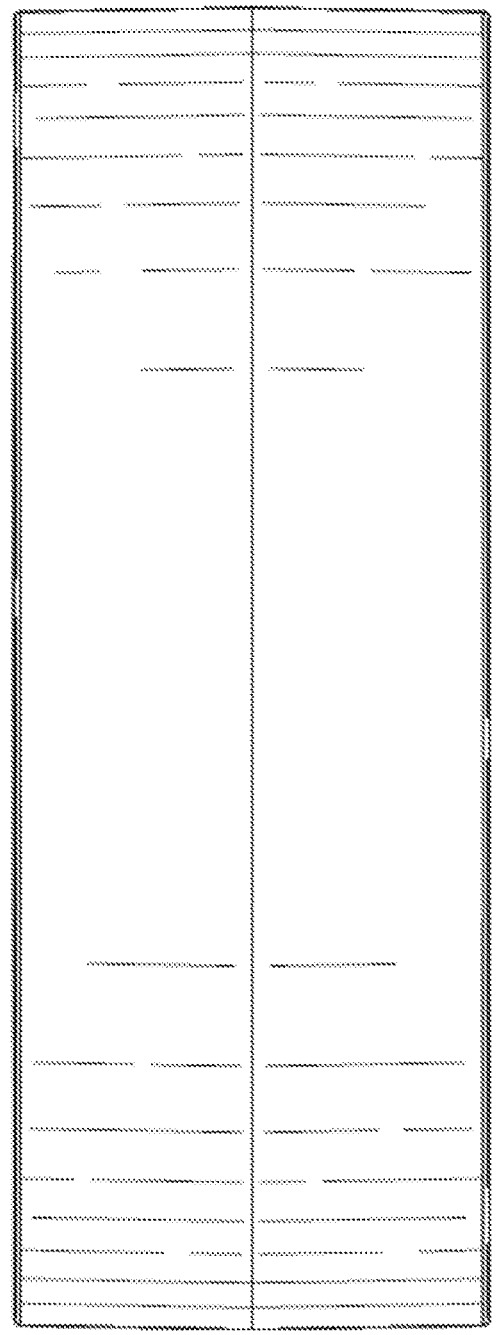
0100   FIG. 4

0100

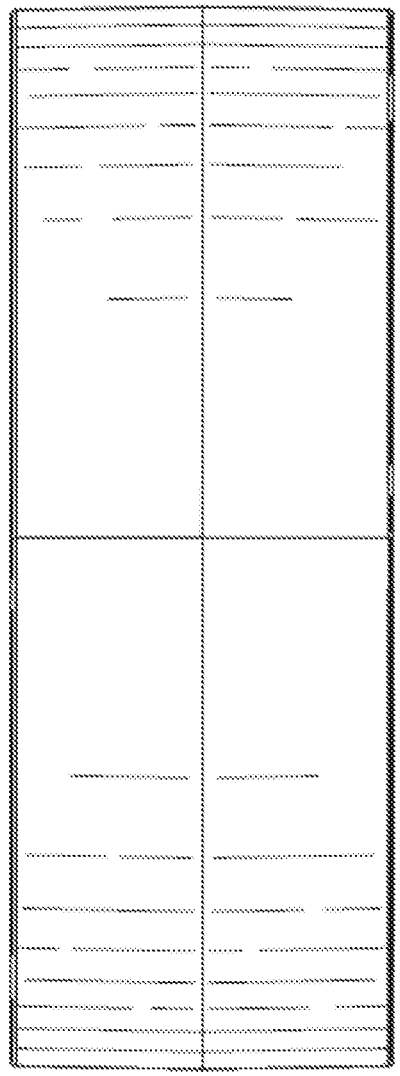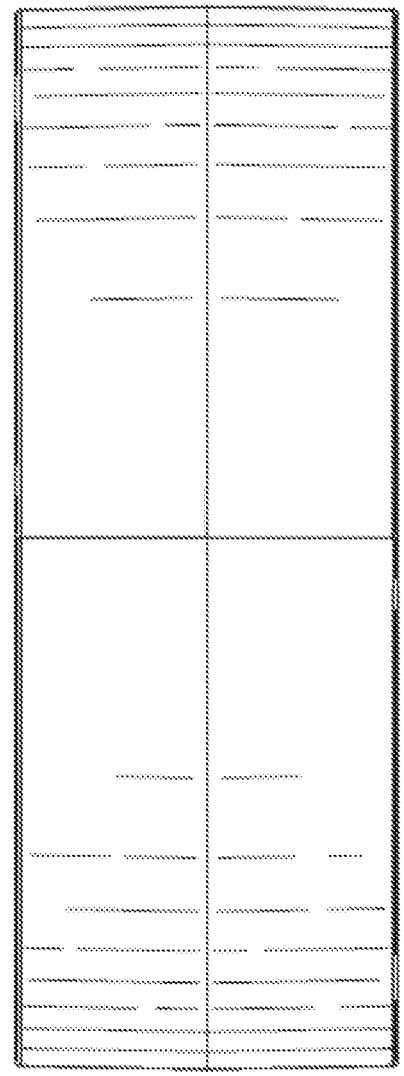
0100 FIG. 7
0100 FIG. 8

0200

0200

0200

0200

0200

0200

0300

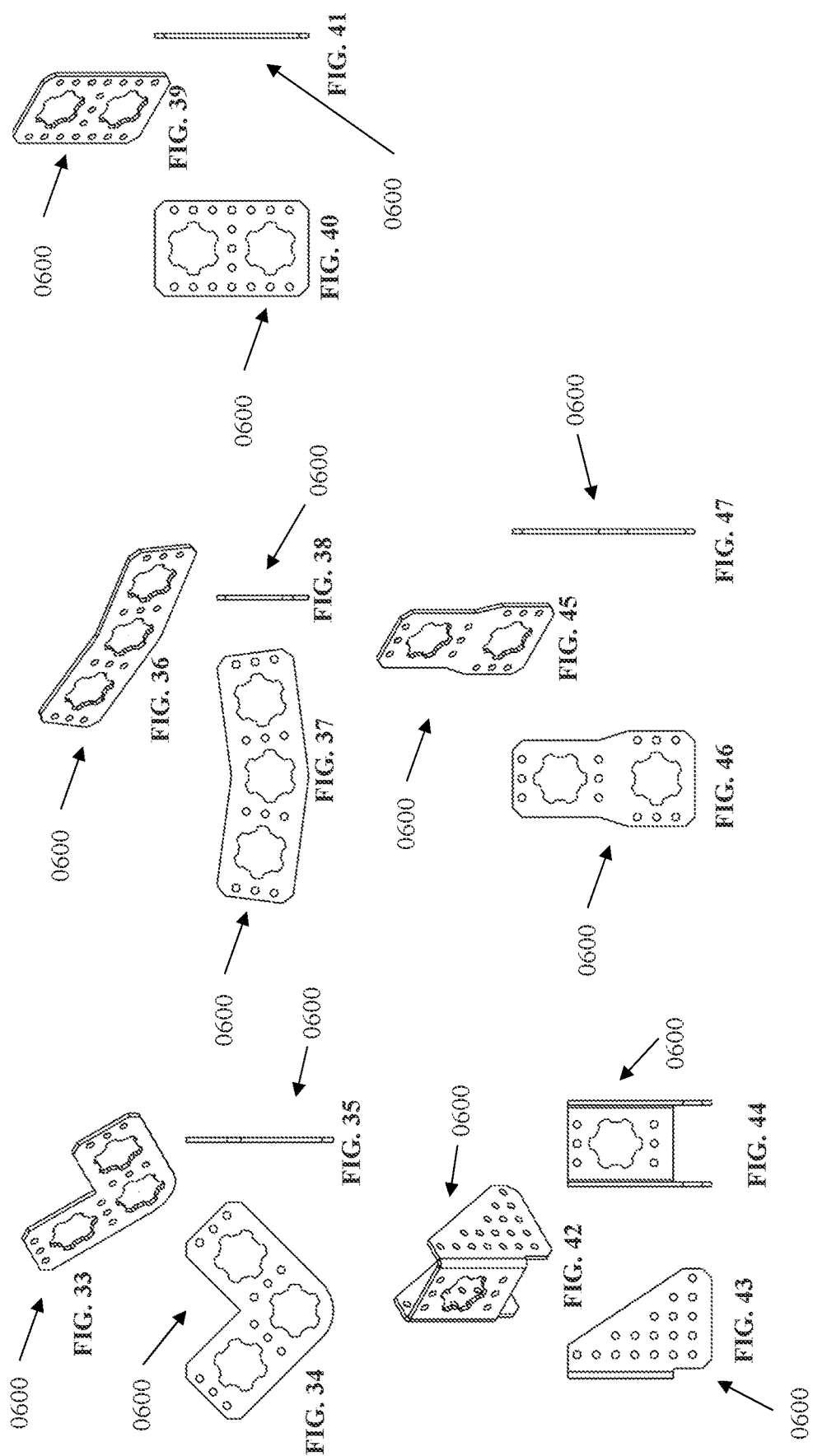

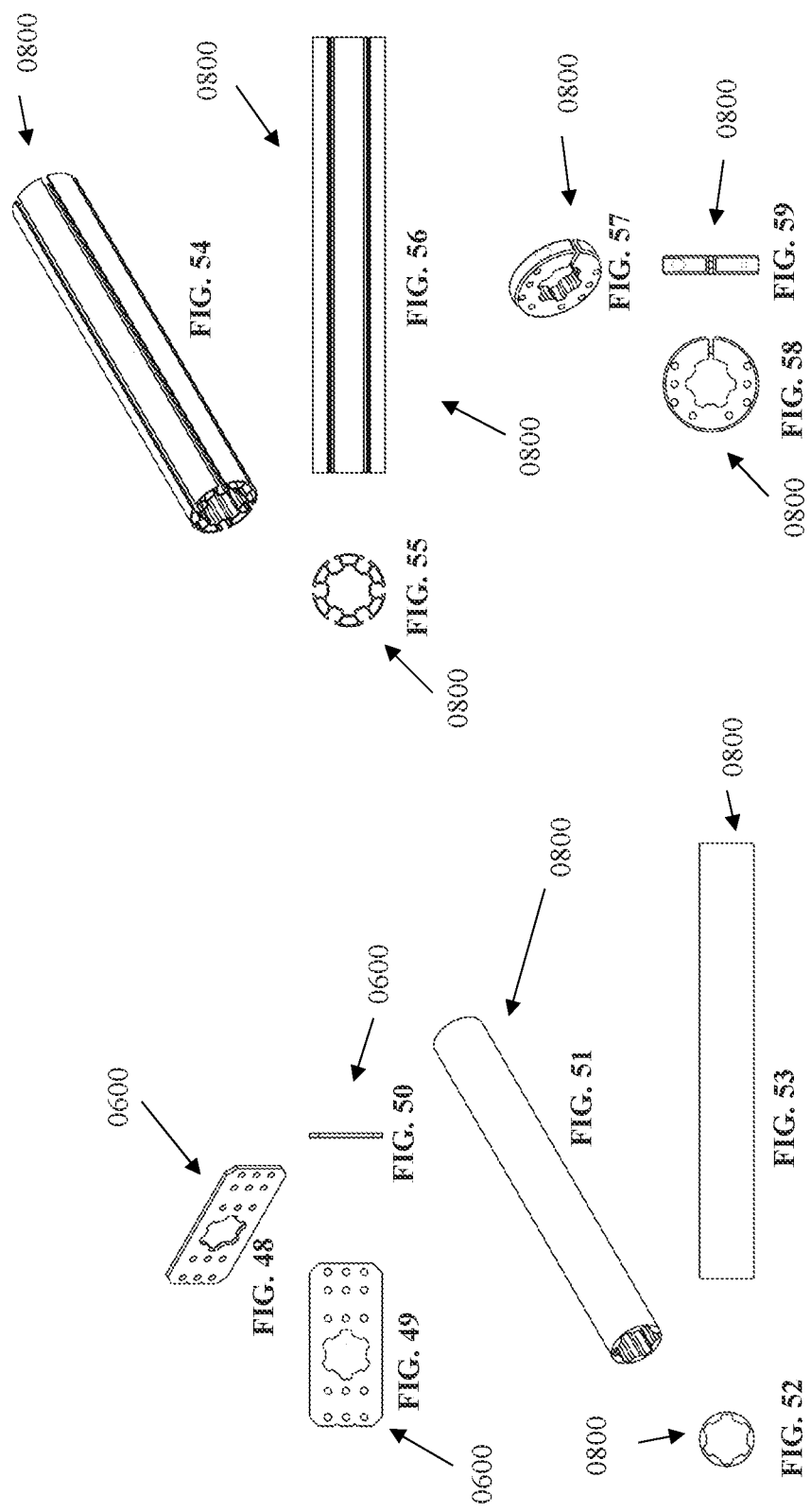

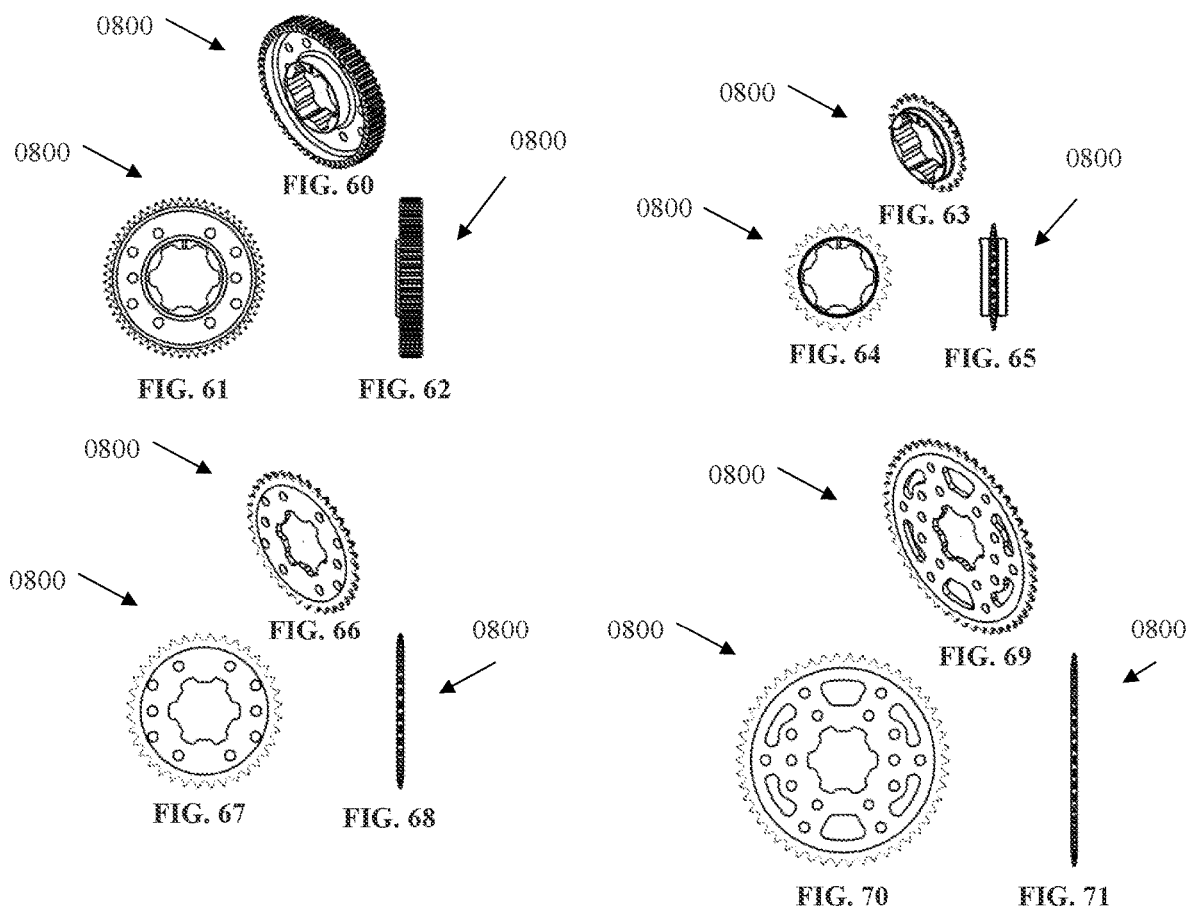

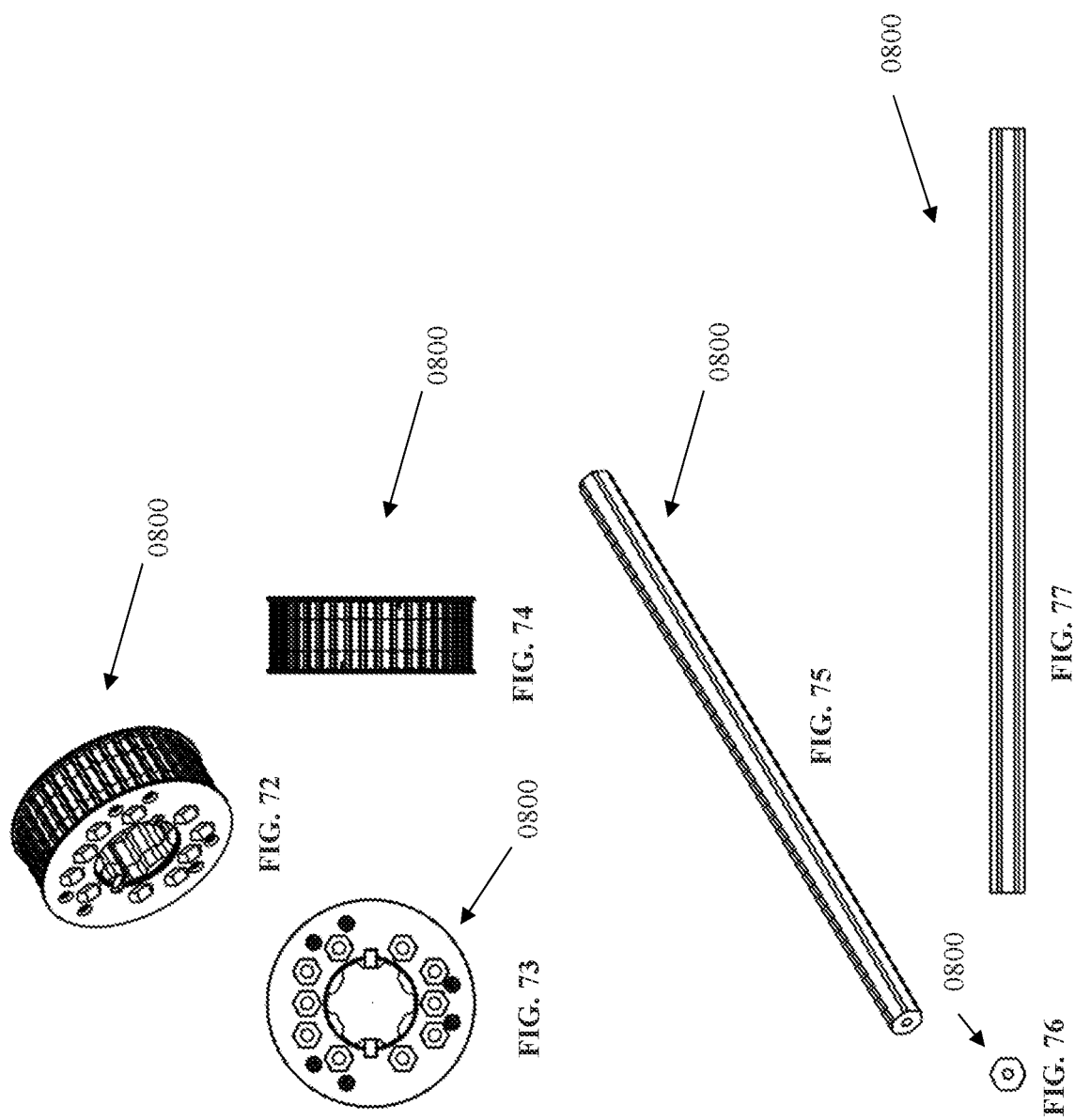

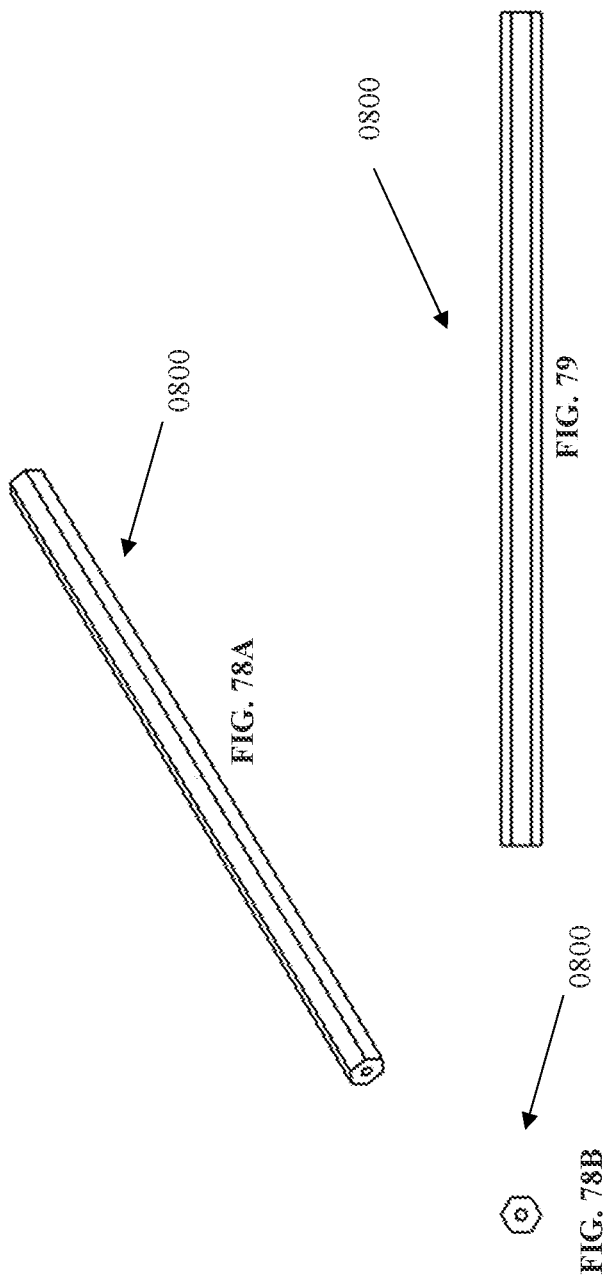

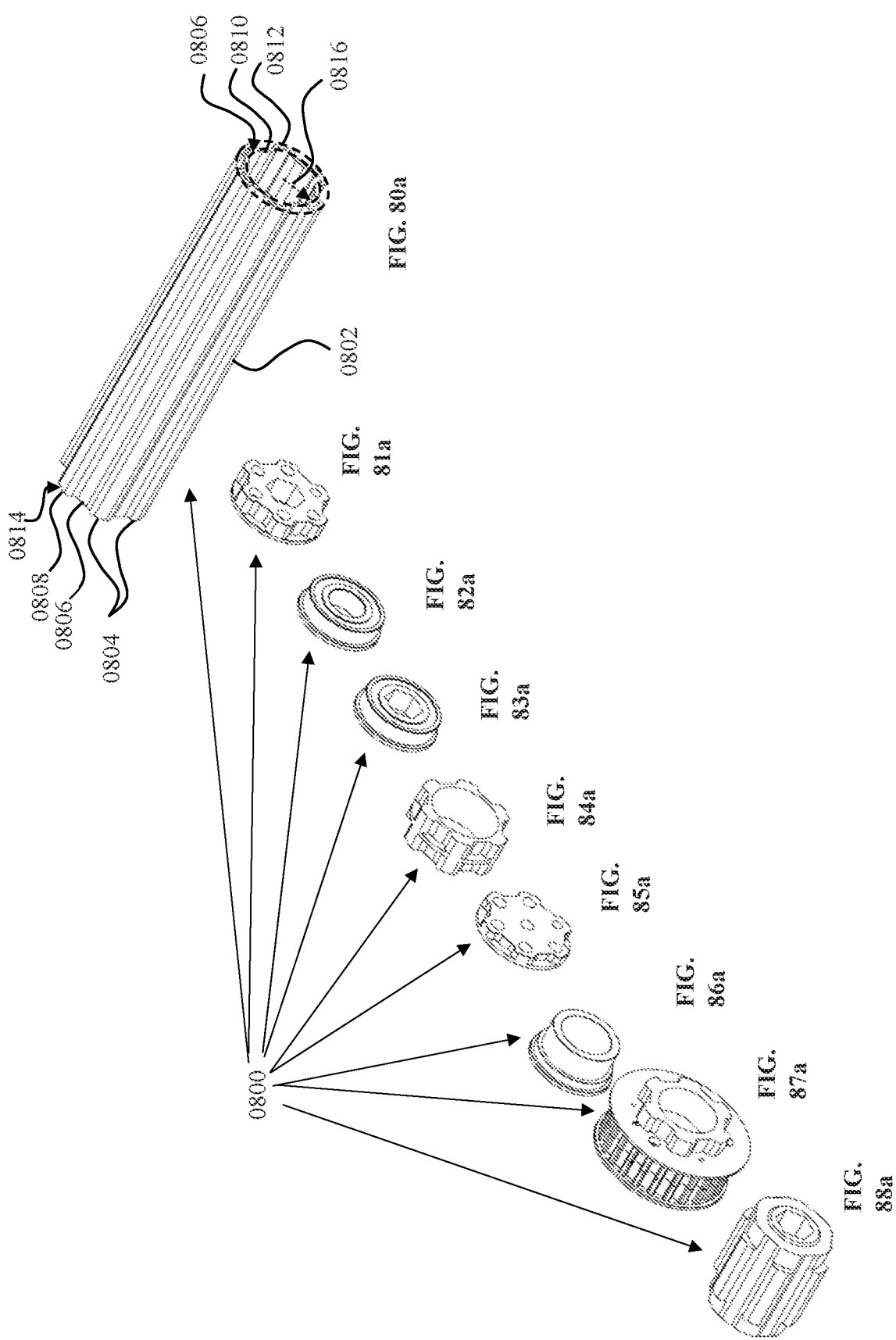

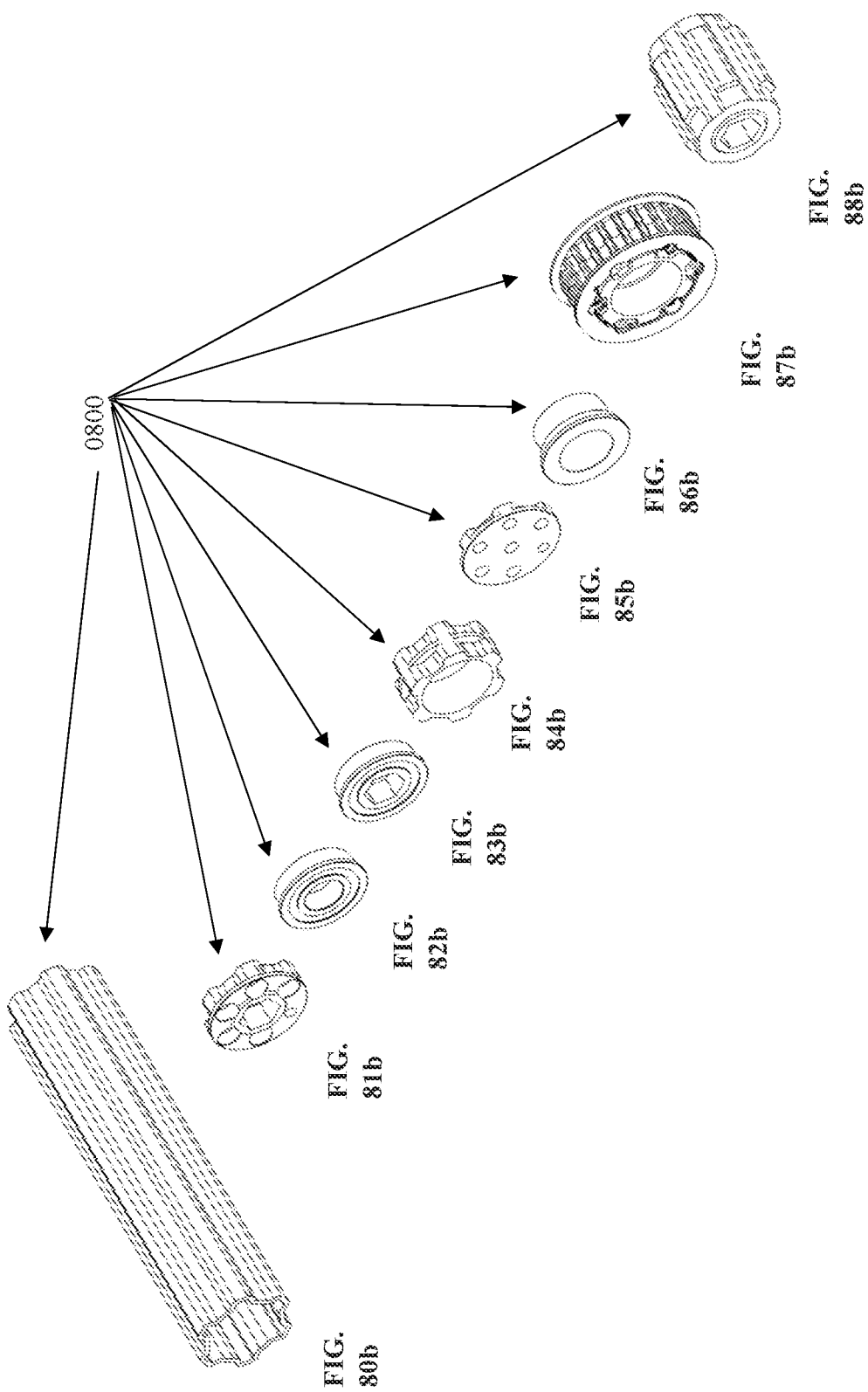

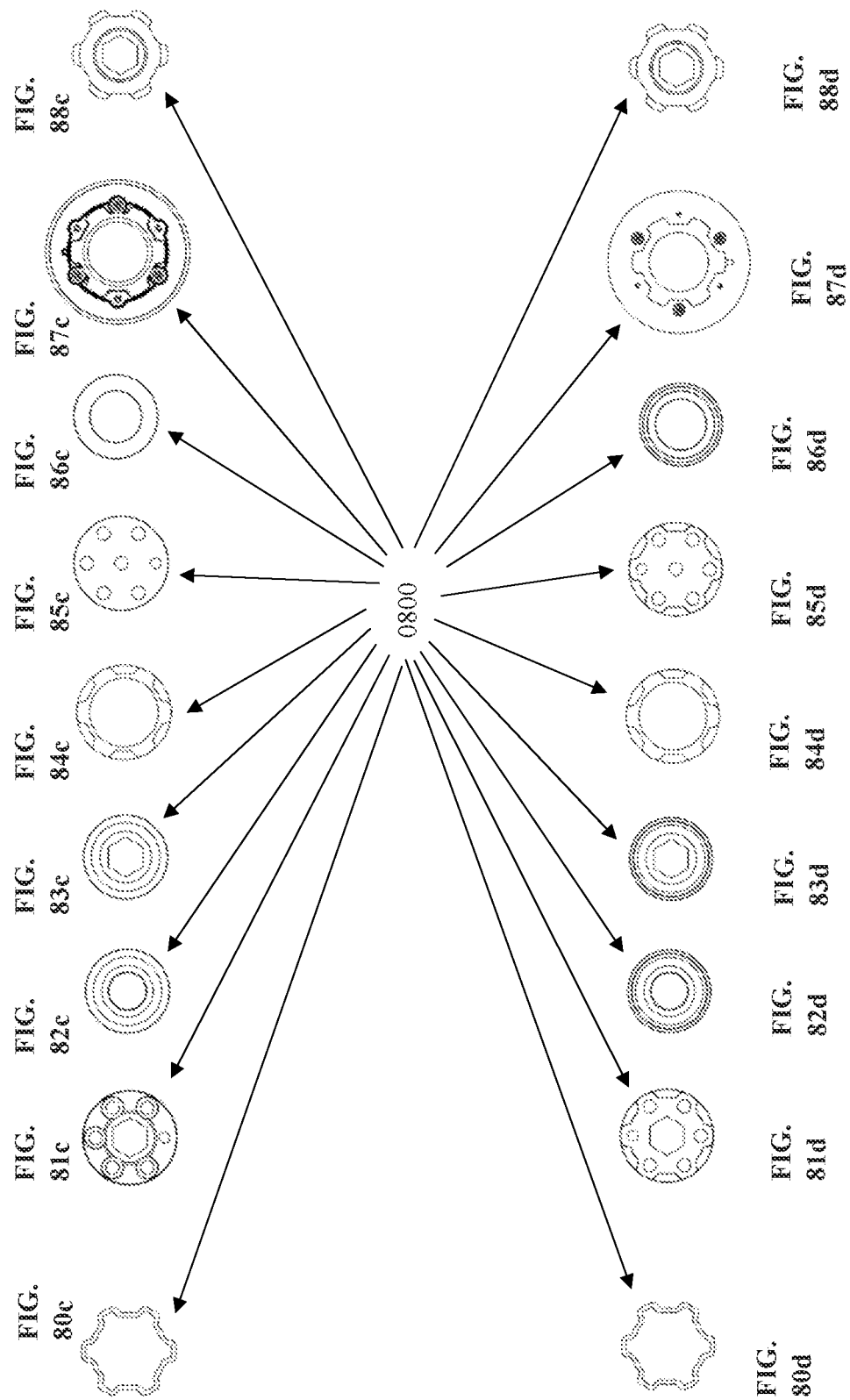

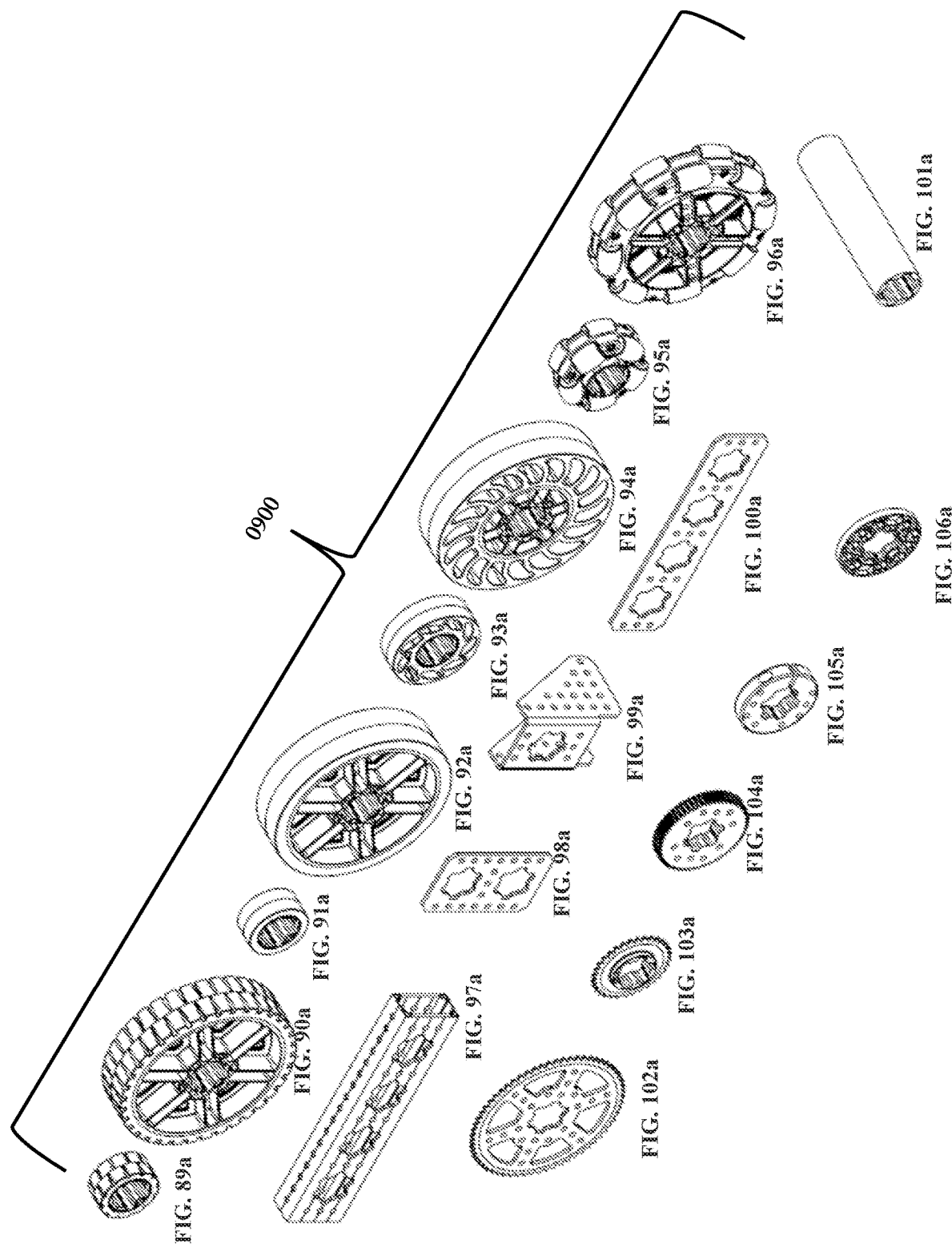

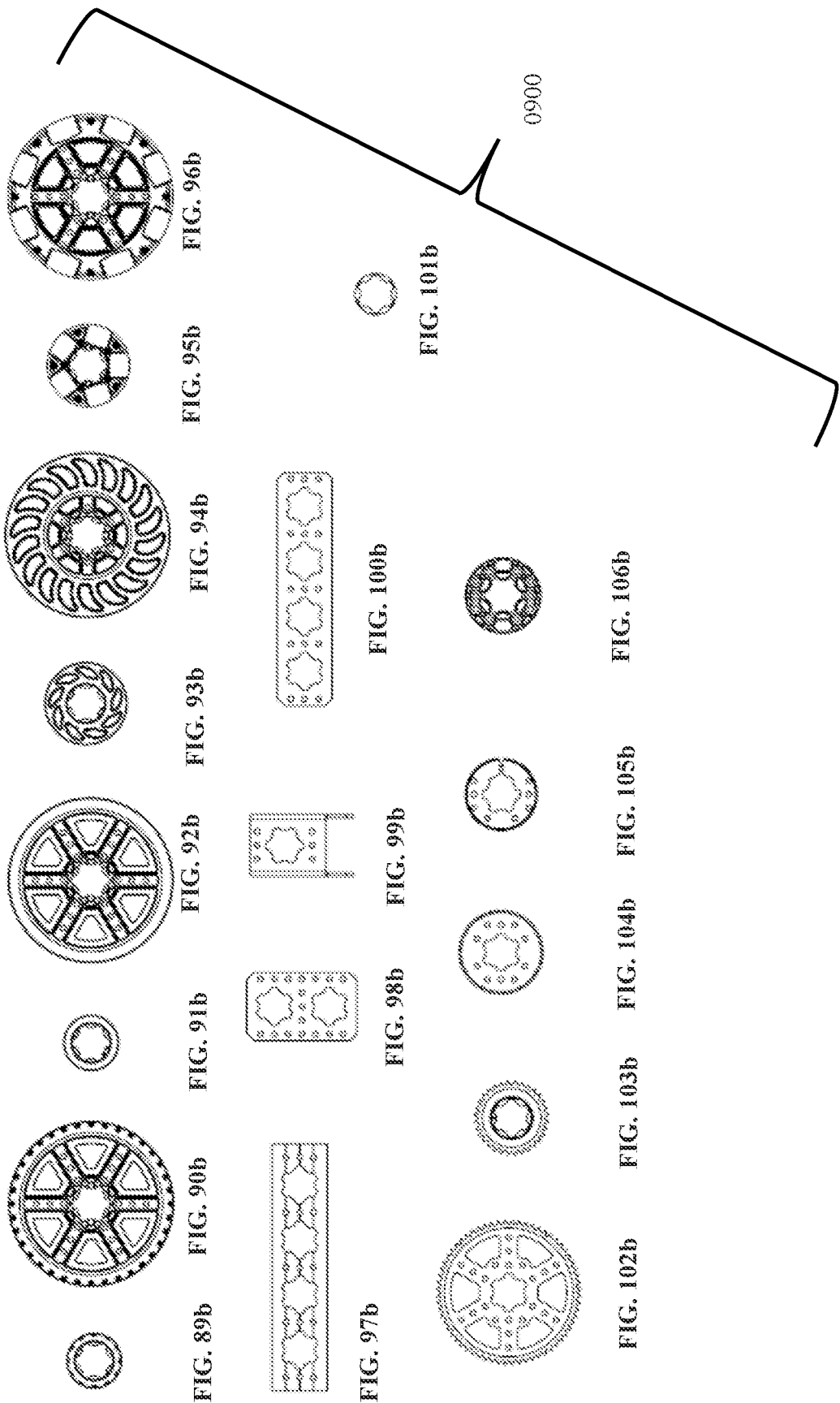

APERTURED ARTICLE, INSERTION ARTICLE AND ASSOCIATED SYSTEMS

CROSS-REFERENCE TO RELATED APPLICATIONS

This application is a continuation-in-part of and claims priority to U.S. Design patent application No. 29/834,695, filed on Apr. 13, 2022 and entitled "Wheel", U.S. Design patent application No. 29/834,696, filed on Apr. 13, 2022 and entitled "Tube", U.S. Design patent application No. 29/834,697, filed on Apr. 13, 2022 and entitled "Omni Wheel", U.S. Design patent application No. 29/834,698, filed on Apr. 13, 2022 and entitled "Hub". Every application, publication and patent listed in this paragraph is hereby incorporated by reference in its entirety as an example.

BACKGROUND OF THE INVENTION

Technical Field

In some aspects, this disclosure relates to an apertured article that can provide both (i) torque bearing, for example, in combination with an object such as a drill bit or live axle that is intended to transfer torque to and/or from the object and which can thereby result in a rotational force directed around an axis of rotation of the object and/or the article, and (ii) act as a bearing or provide bearing support (e.g., to support a bearing), for example, for an apertured article in the form of a wheel connected to a live or dead axle, the apertured article being intended to bear force perpendicular to an axis of rotation of the article. In some aspects, this disclosure relates to an insertion article configured to be inserted into an aperture of the apertured article and optionally having an outer periphery shaped like an inner periphery of the aperture or having the same number of protrusions as an inner periphery of the aperture. In some aspects, this disclosure relates to a combination of the apertured article and an insertion article configured to be inserted into an aperture of the article. In some aspects, this disclosure relates to an interface of the apertured article and an insertion article configured to be inserted into an aperture of the apertured article. In some aspects, this disclosure relates to a system comprising the apertured article, the insertion article, an interface of the apertured article and the insertion article, or any combination thereof, which system can optionally comprise a robot or a component of a robot. Furthermore, in some aspects, this disclosure relates to a system configured so that the apertured article is interchangeable with a substitute apertured article, the insertion article is interchangeable with a substitute insertion article or any combination thereof. In some aspects, this disclosure relates to a system that can be configured for the apertured article to be installed on a live axle or dead axle, and the insertion article can provide at least a portion of the live axle or dead axle.

Description of Related Art

Existing articles or systems for torque bearing or bearing support or that act as a bearing tend to be designed only to either (i) provide torque bearing ability or (ii) provide bearing support or act as a bearing, but not both, especially in the context of interchangeable or modular components. Moreover, some existing articles or systems tend to require components to be bolted onto the articles, for example, bolted onto the face of a wheel, to provide torque transfer, which increases the thickness of an article in one dimension. Other existing articles or system are only compatible with other articles or systems having either a circular exterior cross-section or a polygonal exterior cross-section, for example, a hexagonal exterior cross-section, but not both circular and polygonal exterior cross-sections. These existing articles or systems lack desirable attributes, for example, the ability to be used with a live axle, a dead axle, or a combination thereof, the ability to provide torque transfer, provide bearing support, act as a bearing, or a combination thereof, ease of use; low cost; ease of manufacture; durability; modularity; interchangeability; combinability; or any combination thereof. For example, in some existing devices, different articles or a greater number of different articles are required to achieve desired functionality, which requires more expense and more time exchanging articles to change functionality. As another example, some existing articles or systems are difficult to use, expensive, difficult to manufacture, easily damaged, non-modular, non-interchangeable, non-combinable, incapable of being used to provide a plurality of desired functionalities, or a combination thereof.

Accordingly, existing techniques and associated devices for providing torque transfer, providing bearing support or acting as a bearing have several undesirable characteristics.

SUMMARY OF SELECTED EMBODIMENTS OF THE INVENTION

In accordance with a first embodiment, an apertured article is provided. The apertured article comprises an article aperture. The article aperture comprises an aperture periphery, and the aperture periphery comprises an aperture inner periphery and spaced aperture protrusions that extend radially outwardly from the aperture inner periphery to an aperture outer periphery. The aperture outer periphery is defined by distal edges of the spaced aperture protrusions. The aperture inner periphery is positioned along the circumference of an inner aperture reference circle, the inner aperture reference circle inscribing the aperture periphery, and the aperture outer periphery is positioned along the circumference of an outer aperture reference circle. Optionally, as viewed along a radial line whose origin is at the center of the inner aperture reference circle, the aperture inner periphery is positioned along 0.4 to 0.6 of the entire circumference of the inner aperture reference circle.

In accordance with a first embodiment, an insertion article is provided. The insertion article comprises a body. The body of the insertion article comprises a body exterior periphery, and the body exterior periphery comprises a body inner exterior periphery and spaced body protrusions that extend radially outwardly from the body inner exterior periphery to a body outer exterior periphery. The body outer exterior periphery is defined by distal edges of the spaced body protrusions. The body inner exterior periphery is positioned along the circumference of an inner body reference circle, the inner body reference circle inscribing the body exterior periphery, and the body outer exterior periphery is positioned along the circumference of an outer body reference circle. Optionally, as viewed along a radial line whose origin is at the center of the inner body reference circle, the body inner exterior periphery is positioned along 0.4 to 0.6 of the entire circumference of the inner body reference circle.

Other aspects, embodiments and features of the invention will become apparent from the following detailed description of the invention when considered in conjunction with the accompanying drawings. The accompanying figures are schematic and are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE DRAWINGS

FIG. 3 is a front view of the wheel.

FIG. 4 is a rear view of the wheel.

FIG. 7 is a top view of the wheel.

FIG. 8 is a bottom view of the wheel.

FIGS. 33-79 depict illustrative examples of apertured articles having article apertures, and starting with FIG. 33 each set of three consecutively numbered FIGURES illustrate a single embodiment of an apertured article as depicted in a front-right perspective view, a front view, and a right side view, respectively; FIGS. 51-79 also depict illustrative examples of insertion articles that can be inserted into and engage with an appropriately configured apertured article; FIGS. 33-41 and 45-50 depict plates; FIGS. 42-44 depict an example of a mount comprising plates; FIGS. 45-46 depict an example of a tube tee; FIGS. 51-56 depict examples of tubes and/or extruded articles; FIGS. 54-56 depict examples of rollers; FIGS. 57-59 depict a an example of a hub shaft collar with holes; FIGS. 60-62 depict an example of a gear; FIGS. 63-71 depict examples of sprocket wheels; FIGS. 66-71 depict examples of plate sprocket wheels; FIGS. 72-44 depict examples of pulley; and FIGS. 75-79 depict examples of tubes and/or extruded articles which can have circular apertures.

FIGS. 80a-88d depict illustrative examples of apertured articles, each having an article aperture, and each set of FIGURES with the same number before the letter a, b, c, or d illustrates a single embodiment of an apertured article as depicted in a rear-top-right perspective view, a front-top-right perspective view, a front view, and a rear view, respectively; FIGS. 80a-88d also depict illustrative examples of insertion articles that are apertured articles having an aperture;

FIGS. 89a-106b depict illustrative examples of apertured articles, each having an article aperture, and each pair of FIGURES with the same number before the letter a or b illustrates a single embodiment of an apertured article as depicted in a front-top-right perspective view and a front view, respectively; FIGS. 89a-95a also depict illustrative examples of wheels; FIGS. 89a-90b also depict illustrative examples of wheels having tread patterns along an outer circumference of the wheel; FIGS. 91a-94b also depict illustrative examples of wheels having a smooth outer circumference; FIGS. 95a-96b also depict illustrative examples of omni wheels;

FIGS. 97a-b also depict an illustrative example of a tube; FIGS. 98a-b and 100a-b also depict illustrative examples of plates; FIGS. 99a-b also depict an illustrative example of a mount; FIGS. 102a-b also depict an illustrative example of a plate sprocket wheel; FIGS. 103a-b also depict an illustrative example of a sprocket wheel; FIGS. 104a-b also depict an illustrative example of a gear; FIGS. 105a-b also depict an illustrative example of a shaft collar; FIGS. 106a-b also depict an illustrative example of a spacer, for example, which can be placed between two other articles to separate the two other articles, for example, tubes, extruded articles, insertion articles, apertured articles or any combination thereof.

DETAILED DESCRIPTION

In some embodiments, an article or an associated system described in the present application can solve one or more problems. For example, in some embodiments, when compared to existing devices and techniques that focus on either (i) providing torque transfer or (ii) providing bearing support or acting as a bearing, optionally in the context of an article that is modular or interchangeable with at least one other article, the presently disclosed articles and systems can provide a balance of both (i) providing torque transfer and (ii) providing bearing support capability or acting as a bearing. Moreover, some embodiments of the presently disclosed articles or systems can provide torque transfer without requiring another component to be bolted onto the articles, for example, bolted onto the face of a wheel, thereby avoiding increases the thickness of the articles along at least one dimension, for example, in the direction of an axis of rotation for each article. Further, some embodiments of the presently disclosed articles and systems are compatible with other articles and systems having either a circular exterior cross-section, a polygonal exterior cross-section, for example, a hexagonal exterior cross-section, or both. Additionally, when compared to existing devices and techniques, some embodiments of the presently disclosed articles and systems have desirable attributes, for example, the ability to be used with a live axle, a dead axle, or a combination thereof, the ability to provide torque transfer, provide bearing support, act as a bearing or a combination thereof; ease of use; lower cost than alternatives for the same functionality; ease of manufacture; durability; modularity; interchangeability; combinability; or any combination thereof. For example, in some embodiments of the presently disclosed articles and systems, a single article or a fewer number of different articles can be used to achieve desired functionality, which can reduce expense and time involved in exchanging articles to change functionality. As another example, some embodiments of the presently disclosed articles and systems are easier to use, less expensive, easier to manufacture, less easily damaged, modular, interchangeable, combinable, capable of being used to provide a plurality of desired functionalities, or any combination thereof.

These and other advantageous characteristics of embodiments of the presently disclosed articles and systems will be further evident upon review of the present disclosure.

Figure 1:
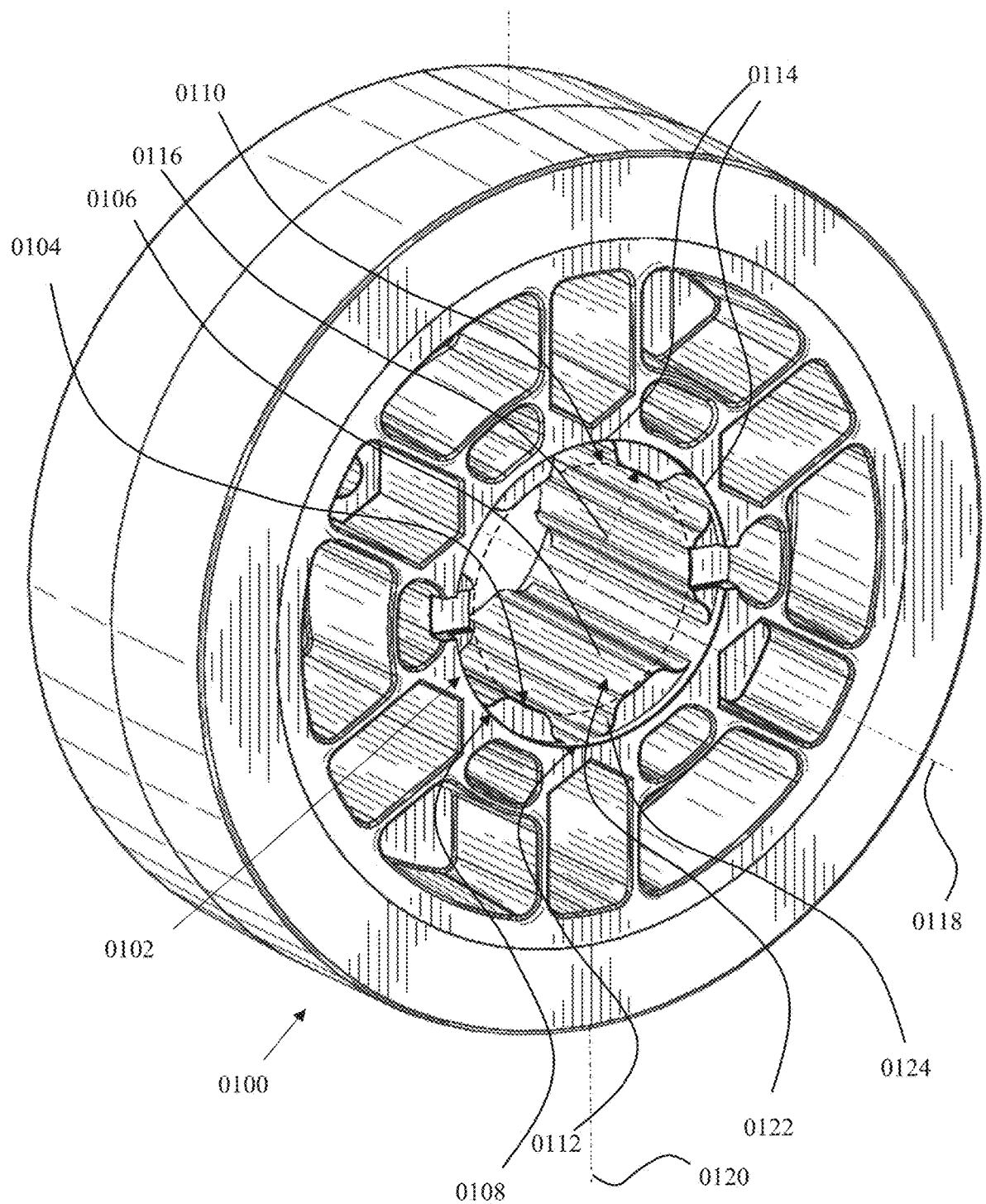
FIG. 1 is a perspective view taken from the front, the top and the right of an example of an apertured article in the form of a wheel.

With reference to FIG. 1, an illustrative embodiment of an apertured article 0100 will now be described with reference to FIG. 1. As illustrated, the apertured article 0100 comprises an article aperture 0102.

The article aperture 0102 comprises an aperture periphery 0104, and the aperture periphery 0104 comprises an aperture inner periphery 0106 and spaced aperture protrusions 0108 that extend radially outwardly from the aperture inner periphery 0106 to an aperture outer periphery 0112. The aperture outer periphery 0112 is defined by distal edges of the spaced aperture protrusions 0108.

The aperture inner periphery 0106 is positioned along the circumference of an inner aperture reference circle 0110, the inner aperture reference circle 0110 inscribing the aperture periphery 0104, and the aperture outer periphery 0112 is positioned along the circumference of an outer aperture reference circle 0114.

In some embodiments, as viewed along a radial line 0116 whose origin is at the center of the inner aperture reference circle 0110, the aperture inner periphery 0106 is positioned along the circumference of the inner aperture reference circle 0110 for a distance equal to 0.4 to 0.6 of the entire circumference of the inner aperture reference circle 0110. The aperture inner periphery 0106 is deemed to be positioned along the circumference of the inner aperture reference circle 0110 when the aperture inner periphery 0106 is spaced from the circumference of the inner aperture reference circle 0110 by a distance of no more than 0.75 of the length of the radius of the inner aperture reference circle.

In some embodiments, the aperture comprising an aperture axis that is a rotational axis 0118 of symmetry of the aperture, a reflection axis 0120 of symmetry of the aperture, or an axis 0118 along which the aperture is configured to receive an insertion article 0800.

In some embodiments, the apertured article 0100 has an even number of the spaced aperture protrusions 0108.

In some embodiments, the article aperture 0102 comprises at least 3 aperture protrusions and no more than 8 aperture protrusions.

In some embodiments, the aperture inner periphery 0106 is located on the inner aperture reference circle 0110, and optionally the aperture inner periphery 0106 consists of the portions of the aperture periphery 0104 located on or within a set distance from the inner aperture reference circle 0110 the set distance equal to 0.75 of the radius of the inner aperture reference circle 0110.

In some embodiments, the aperture inner periphery 0106 is located on an inner reference polygon that circumscribes the inner aperture reference circle 0110. Optionally, the aperture inner periphery 0106 consists of the portions of the aperture periphery 0104 located on or within a set distance from the inner aperture reference circle 0110 the set distance equal to 0.75 of the radius of the inner aperture reference circle 0110.

In some embodiments, the inner peripheral surfaces 0122 of the apertured article 0100 define the aperture inner periphery 0106 and are configured to act as a bearing for an insertion article 0800 positioned in contact with the inner peripheral surfaces 0122 of the apertured article 0100.

In some embodiments, the aperture protrusion surfaces 0124 of the apertured article 0100 define the spaced aperture protrusions 0108 and are configured to provide torque transfer from or to an insertion article 0800 positioned in contact with the aperture protrusion surfaces 0124 of the apertured article 0100.

In some embodiments, the apertured article 0100 is configured (i) to receive and act as a bearing for a first insertion article 0800 configured to engage surfaces of the apertured article 0100 along the aperture inner periphery 0106, the first insertion article 0800 having a circular exterior cross-section or a polygonal exterior cross-section. and (ii) to receive and transfer torque from or to a second insertion article 0800 having an exterior cross-section configured to engage surfaces of the apertured article 0100 along the spaced aperture protrusions 0108.

In some embodiments, the apertured article 0100 is configured to engage and rotate with a live axle around an axis 0118 of rotation.

In some embodiments, the apertured article 0100 is configured to engage a dead axle and rotate around an axis 0118 of rotation oriented along the dead axle.

In some embodiments, the apertured article 0100 is configured to have a set of edges in a plane (e.g., the plane perpendicular to an axis 0118 of the apertured article or the article aperture) and all of the edges in the set of edges (e.g., the edges of the article that define the article aperture) are rounded, having a radius of curvature of at least 1.5 mm.

With reference to FIG. 80, an illustrative embodiment of an insertion article 0800 will now be described. As illustrated, the insertion article 0800 comprises a body 0802.

The body 0802 of the insertion article 0800 comprises a body exterior periphery 0804, and the body exterior periphery 0804 comprises a body inner exterior periphery 0806 and spaced body protrusions 0808 that extend radially outwardly from the body inner exterior periphery 0806 to a body outer exterior periphery 0814. The body outer exterior periphery 0814 is defined by distal edges of the spaced body protrusions 0808.

The body inner exterior periphery 0806 is positioned along the circumference of an inner body reference circle 0810, the inner body reference circle 0810 inscribing the body exterior periphery 0804, and the body outer exterior periphery 0814 is positioned along the circumference of an outer body reference circle 0812.

In some embodiments, as viewed along a radial line whose origin is at the center of the inner body reference circle 0810, the body inner exterior periphery 0806 is positioned along the circumference of the inner body reference circle for a distance equal 0.4 to 0.6 of the entire circumference of the inner body reference circle 0810.

In some embodiments, the insertion article 0800 comprises an apertured article 0100, the apertured article 0100 comprising an article aperture 0102. The article aperture 0102 comprises an aperture periphery 0104, and the aperture periphery 0104 comprises an aperture inner periphery 0106 and spaced aperture protrusions 0108 that extend radially outwardly from the aperture inner periphery 0106 to an aperture outer periphery 0112. The aperture outer periphery 0112 is defined by distal edges of the spaced aperture protrusions 0108.

The aperture inner periphery 0106 is positioned along the circumference of an inner aperture reference circle 0110, and the aperture outer periphery 0112 is positioned along the circumference of an outer aperture reference circle 0114.

In some embodiments, the body exterior periphery 0804 comprises from 3 to 8 body 0802 protrusions.

In some embodiments, the body inner exterior periphery 0806 is located on the inner body reference circle 0810. Optionally, the body inner exterior periphery 0806 consists of the portions of the body exterior periphery 0804 located on or within a set distance from the inner body reference circle 0810, the set distance equal to 0.75 of the radius of the inner body reference circle 0810.

With reference to FIG. 1 and FIG. 80, an illustrative embodiment of an system will now be described. As illustrated, the system comprises the apertured article 0100 and the insertion article 0800, which is configured to be engaged with the apertured article 0100.

The insertion article 0800 comprises a body 0802. The body 0802 of the insertion article 0800 comprises a body exterior periphery 0804, and the body exterior periphery 0804 comprises a body inner exterior periphery 0806 and spaced body protrusions 0808 that extend radially outwardly from the body inner exterior periphery 0806 to a body outer exterior periphery 0814. The body outer exterior periphery 0814 is defined by distal edges of the spaced body protrusions 0808.

The body inner exterior periphery 0806 is positioned along the circumference of an inner body reference circle 0810, and the body outer exterior periphery 0814 is positioned along the circumference of an outer body reference circle 0812.

In some embodiments, the system comprises a plurality of insertion articles comprising the insertion article 0800, and the plurality of insertion articles comprises a first additional insertion article 0800 and a second additional insertion article 0800, the first additional insertion article 0800 having a circular exterior cross-section and configured to engage surfaces of the apertured article 0100 along the aperture inner periphery 0106, the second additional insertion article 0800 having a polygonal exterior cross-section and configured to engage surfaces of the apertured article 0100 along the aperture inner periphery 0106.

In some embodiments, the insertion article 0800 is a second apertured article 0100, the second apertured article 0100 comprising a second article aperture 0102.

The second article aperture 0102 comprises a second aperture periphery 0104, and the second aperture periphery 0104 comprises a second aperture inner periphery 0106 and second spaced aperture protrusions 0108 that extend radially outwardly from the second aperture inner periphery 0106 to a second aperture outer periphery 0112.

The second aperture outer periphery 0112 is defined by second distal edges of the second spaced aperture protrusions 0108.

The second aperture inner periphery 0106 is positioned along the circumference of a second inner aperture reference circle 0110, and the second aperture outer periphery 0112 is positioned along the circumference of a second outer aperture reference circle 0114.

In some embodiments, the entire apertured article 0100 or at least a portion of the apertured article 0100 is configured to be rotatable around or to rotate around an article axis 0118 of rotation that passes through the article aperture 0102.

In some embodiments, the system comprises at least one other article, and the apertured article 0100, the insertion article 0800, or any combination thereof is configured to be modular or interchangeable with at least one other article in the system.

Figure 2:
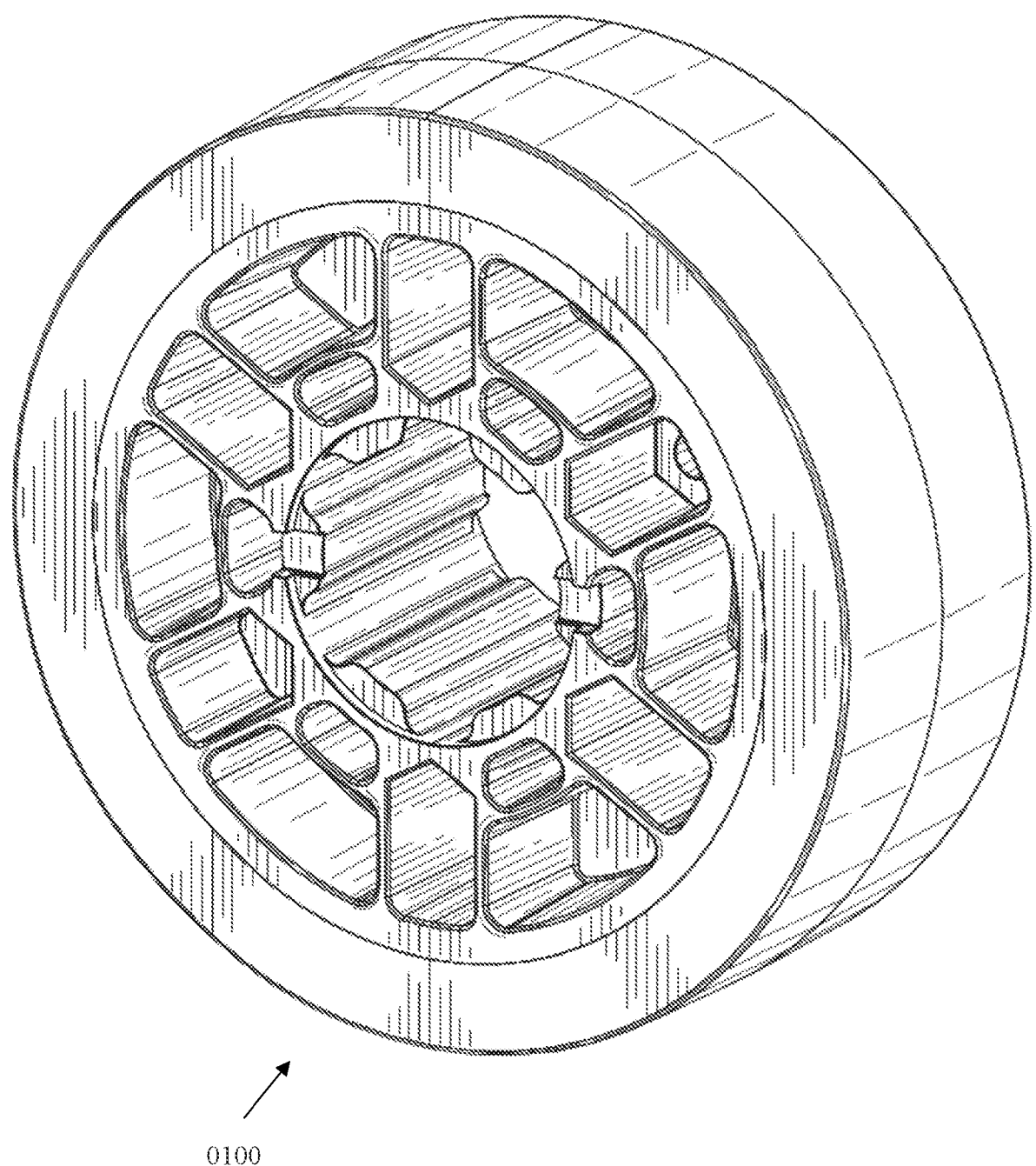
FIG. 2 is a perspective view taken from the rear, the bottom and the left of the wheel.

FIG. 2 is a perspective view taken from the rear, the bottom and the left of the wheel 0100.

FIG. 3 is a front view of the wheel 0100.

FIG. 4 is a rear view of the wheel 0100.

Figure 5:
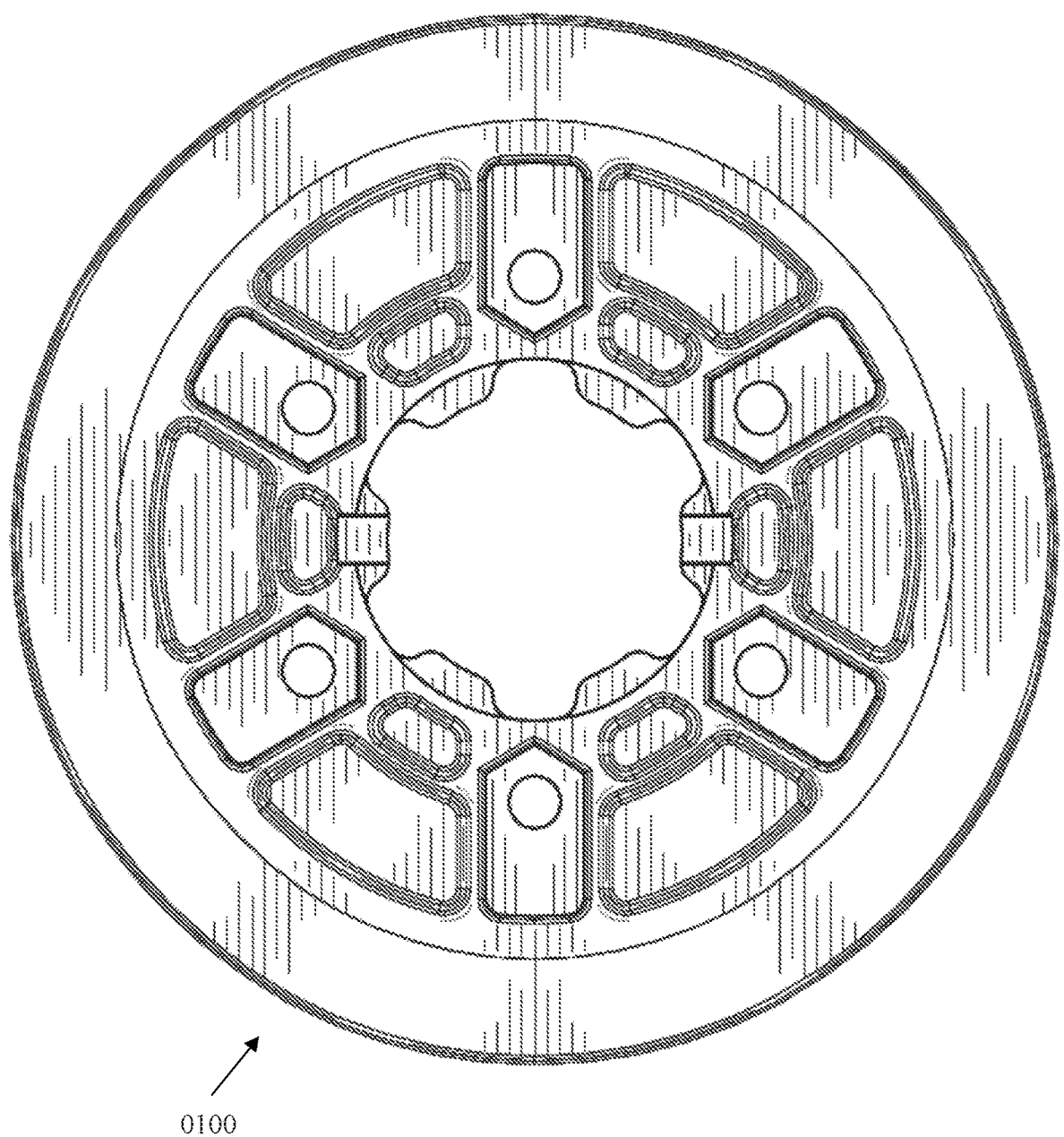
FIG. 5 is a left side view of the wheel.

FIG. 5 is a left side view of the wheel 0100.

Figure 6:
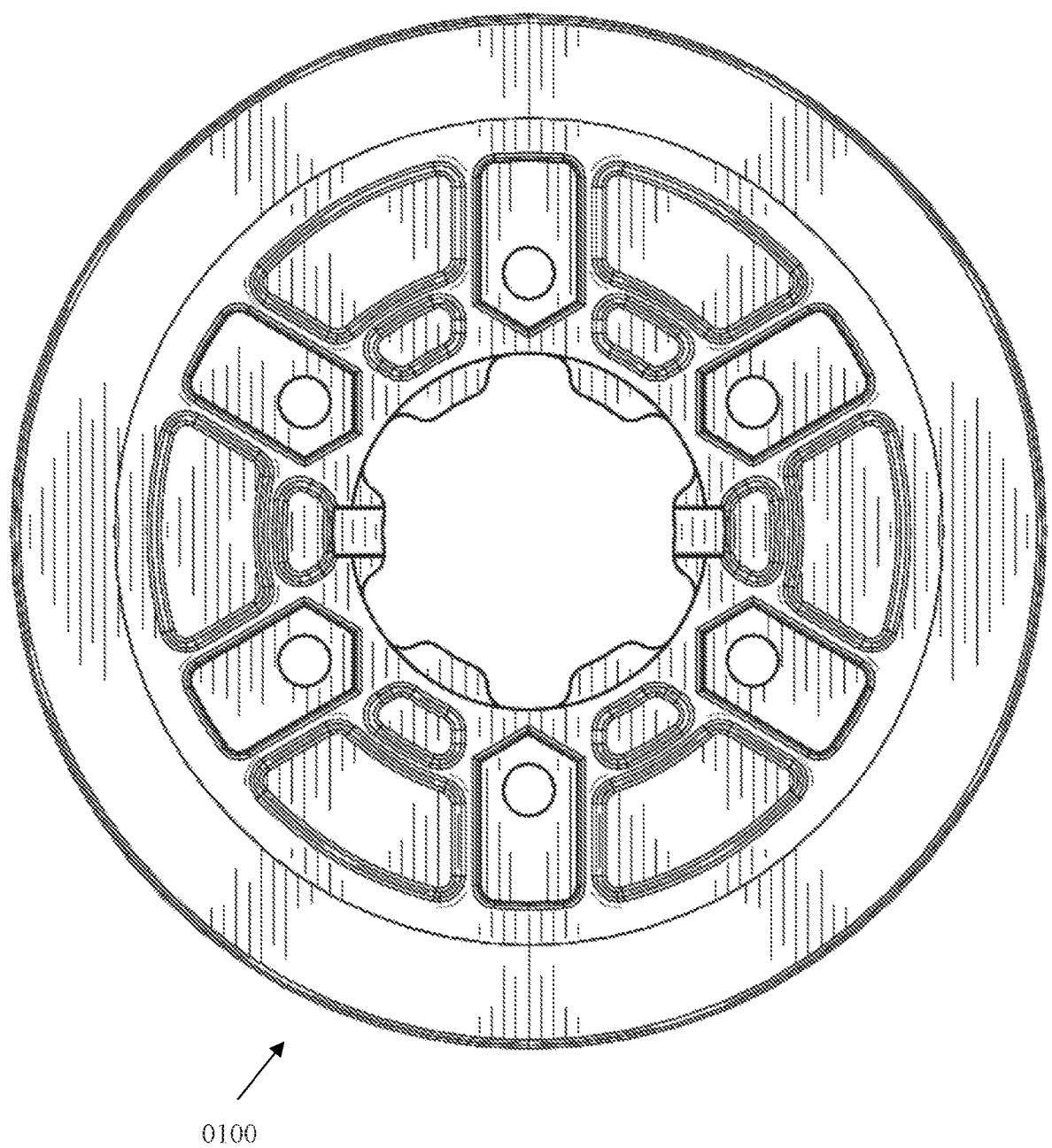
FIG. 6 is a right side view of the wheel.

FIG. 6 is a right side view of the wheel 0100.

FIG. 7 is a top view of the wheel 0100.

FIG. 8 is a bottom view of the wheel 0100.

Figure 9:
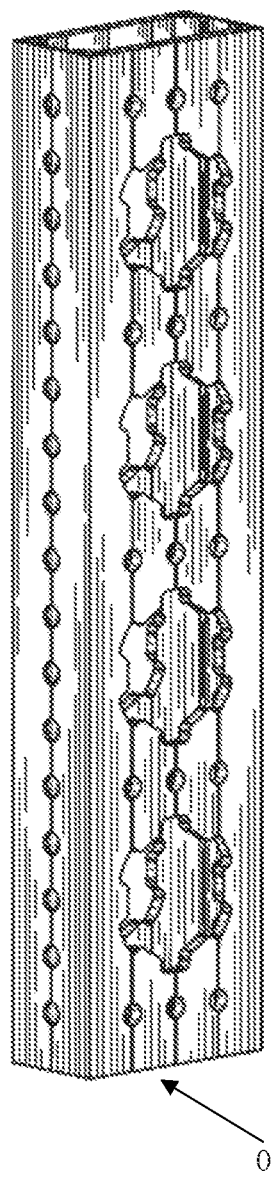
FIG. 9 is a perspective view taken from the front, the top and the right of an example of an apertured article in the form of a tube.

FIG. 9 is a perspective view taken from the front, the top and the right of an example of an apertured article in the form of a tube 0200.

Figure 10:
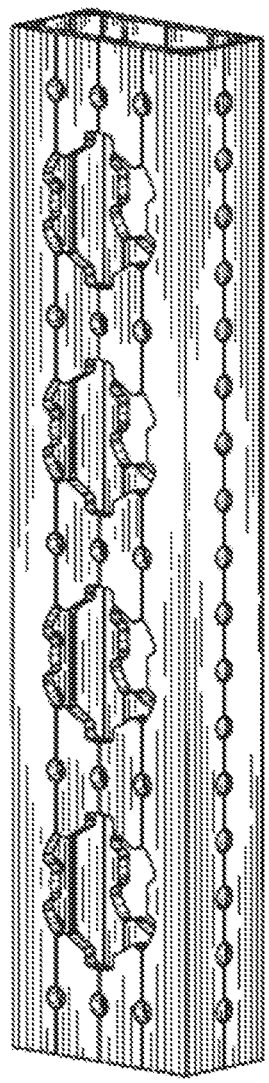
FIG. 10 is a perspective view taken from the rear, the bottom and the left of the tube.

FIG. 10 is a perspective view taken from the rear, the bottom and the left of the tube 0200.

Figure 11:
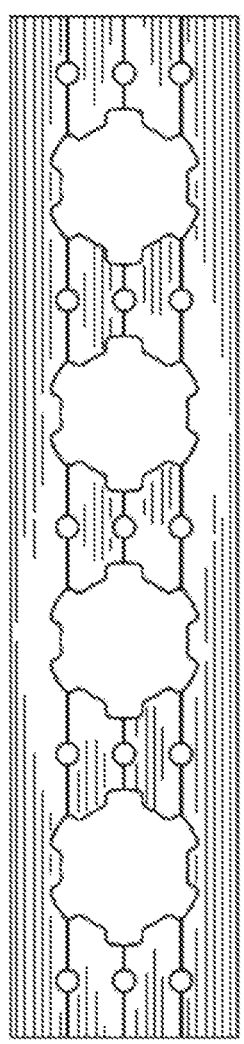
FIG. 11 is a right side view of the tube.

FIG. 11 is a right side view of the tube 0200.

Figure 12:
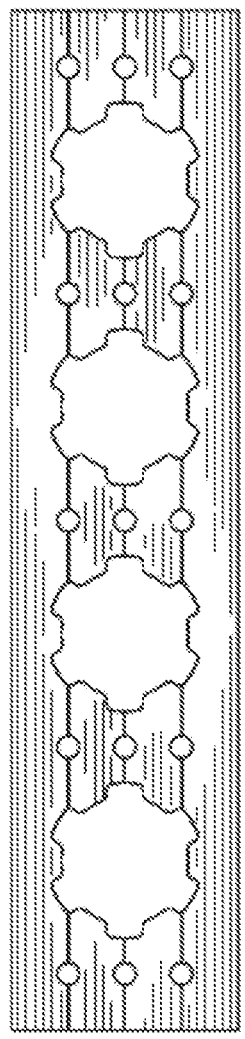
FIG. 12 is a left side view of the tube.

FIG. 12 is a left side view of the tube 0200.

Figure 13:
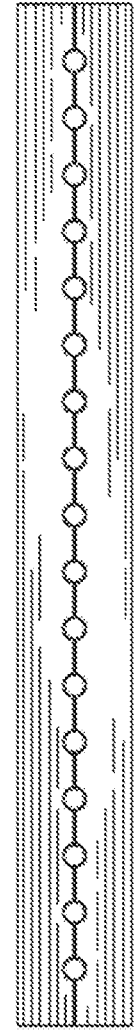
FIG. 13 is a front view of the tube.

FIG. 13 is a front view of the tube 0200.

Figure 14:
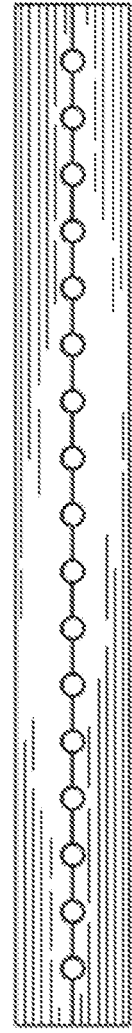
FIG. 14 is a rear view of the tube.

FIG. 14 is a rear view of the tube 0200.

Figure 15:
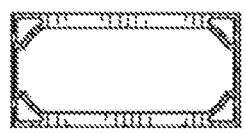
FIG. 15 is a top view of the tube.

FIG. 15 is a top view of the tube 0200.

Figure 16:
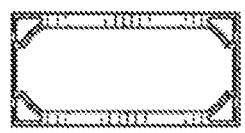
FIG. 16 is a bottom view of the tube.

FIG. 16 is a bottom view of the tube 0200.

Figure 17:
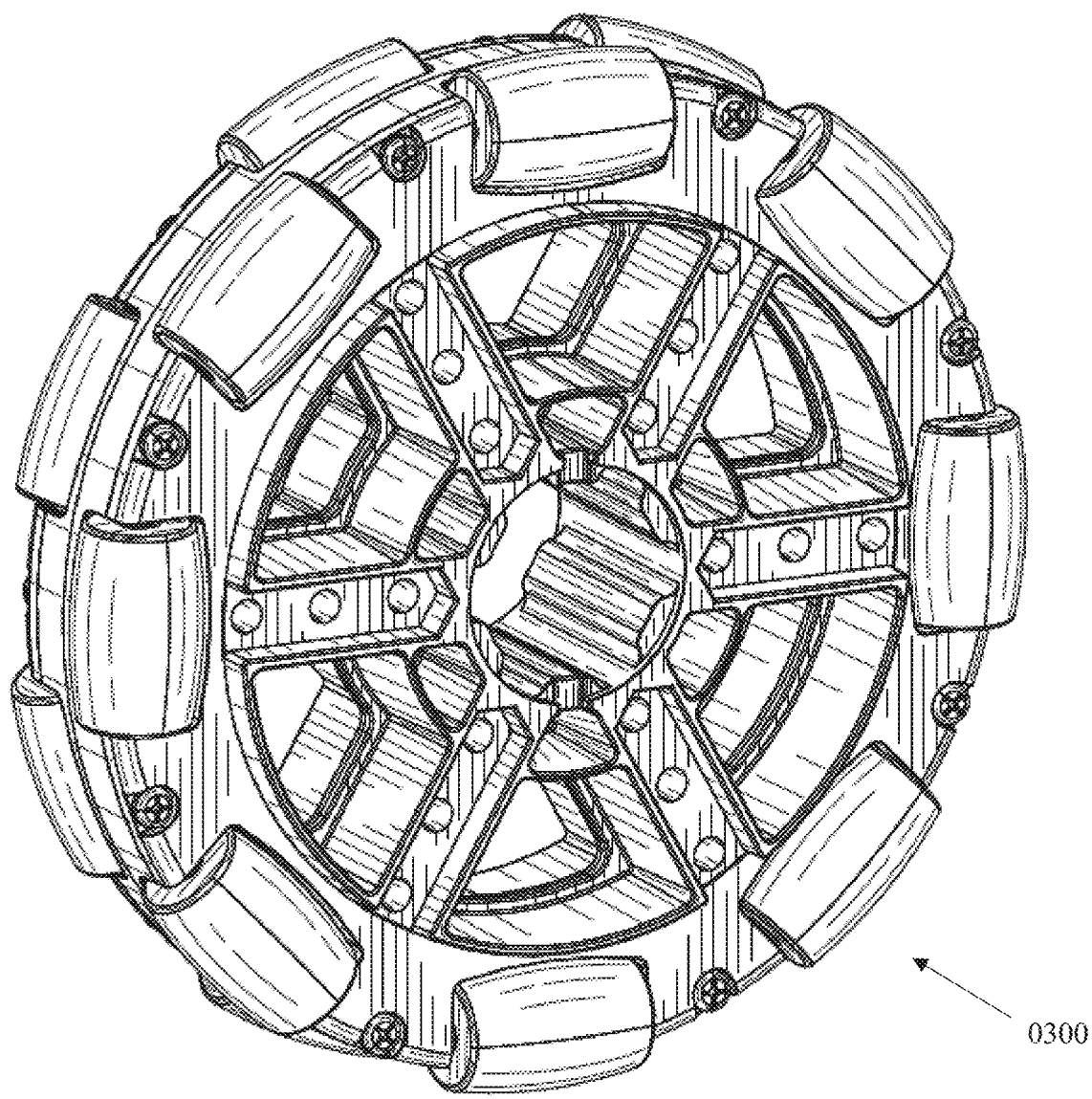
FIG. 17 is a perspective view taken from the front, the top and the right of an example of an apertured article in the form of an omni wheel.

FIG. 17 is a perspective view taken from the front, the top and the right of an example of an apertured article in the form of an omni wheel 0300.

Figure 18:
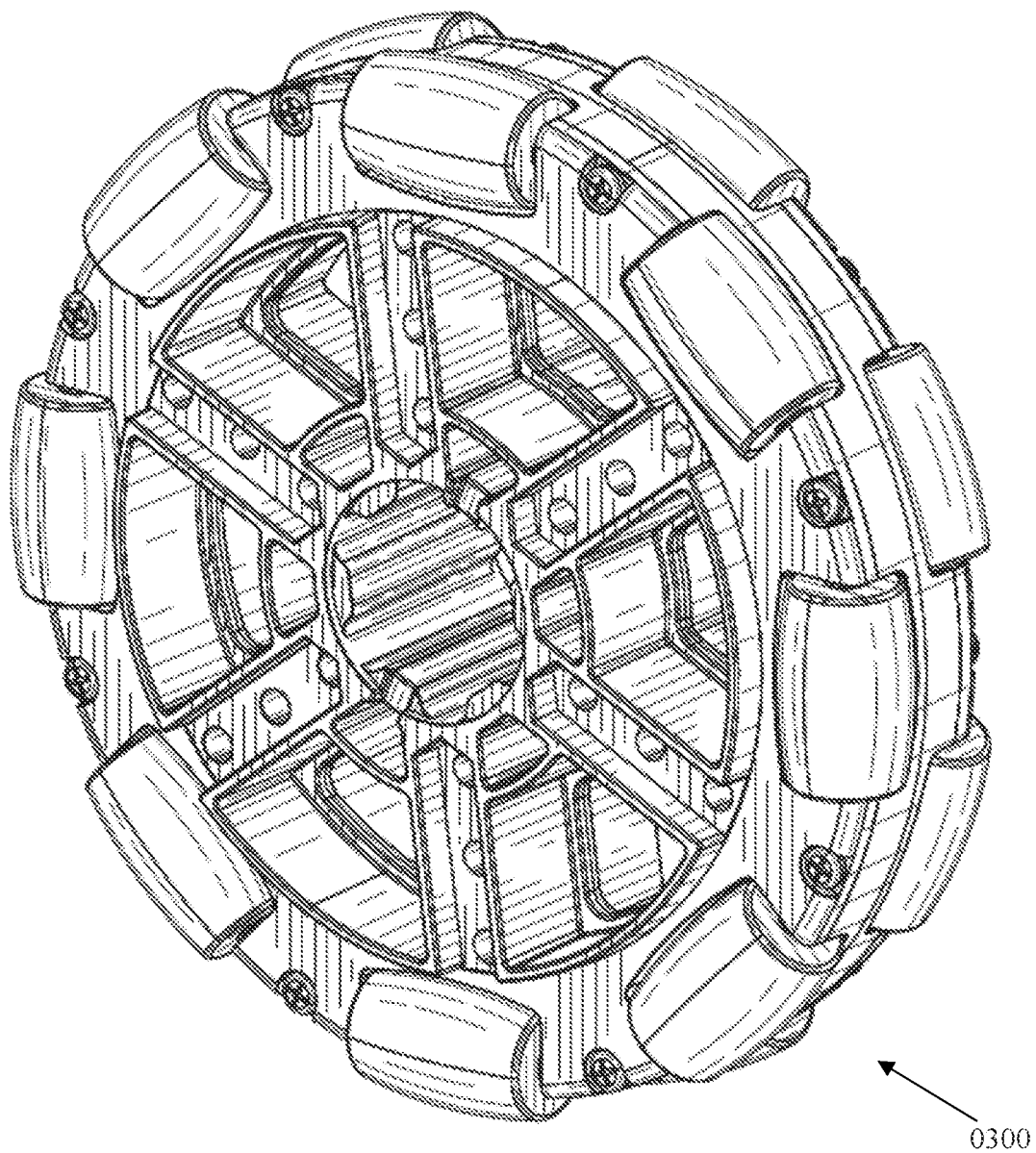
FIG. 18 is a perspective view taken from the rear, the bottom and the left of the omni wheel.

FIG. 18 is a perspective view taken from the rear, the bottom and the left of the omni wheel 0300.

Figure 19:
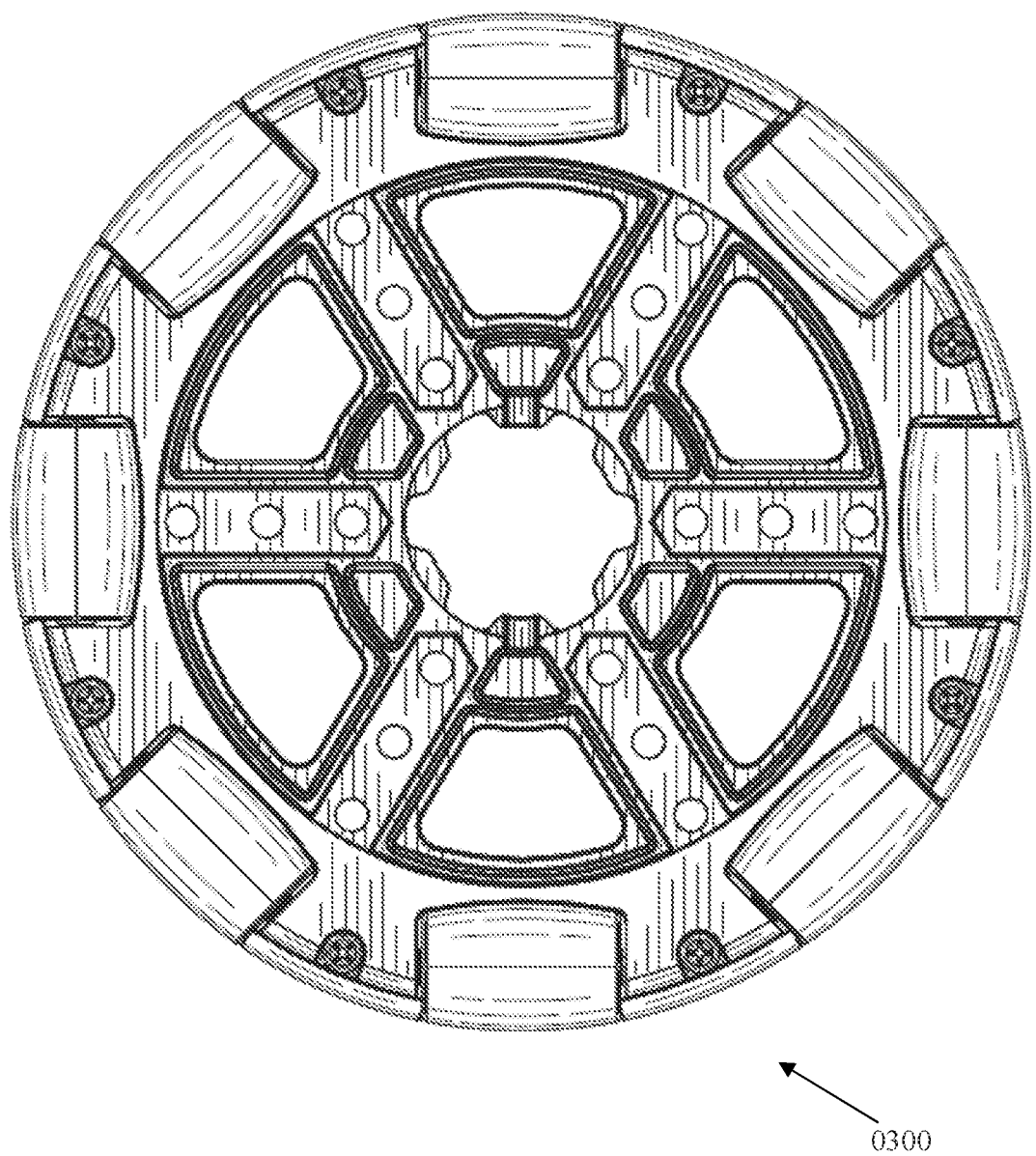
FIG. 19 is a right side view of the omni wheel.

FIG. 19 is a right side view of the omni wheel 0300.

Figure 20:
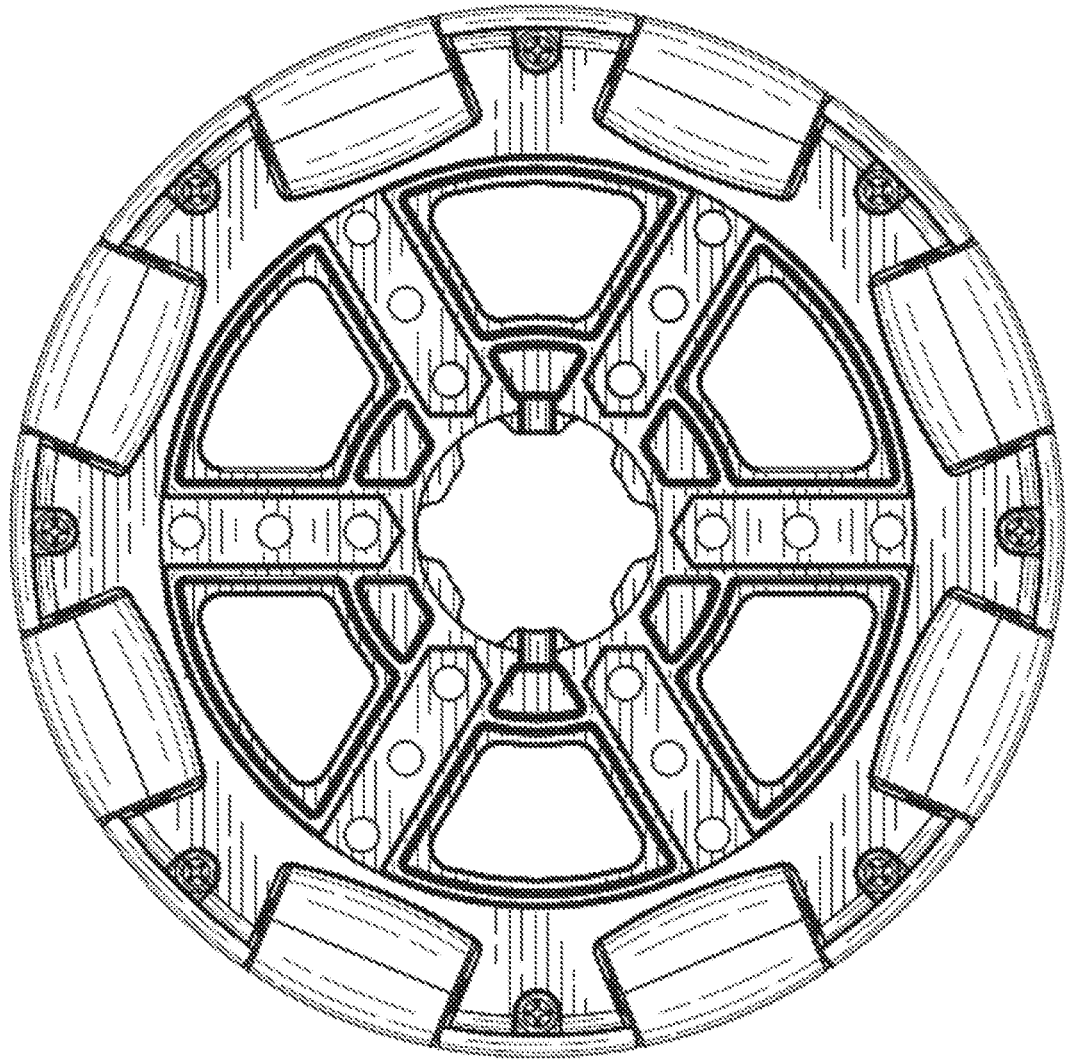
FIG. 20 is a left side view of the omni wheel.

FIG. 20 is a left side view of the omni wheel 0300.

Figure 21:
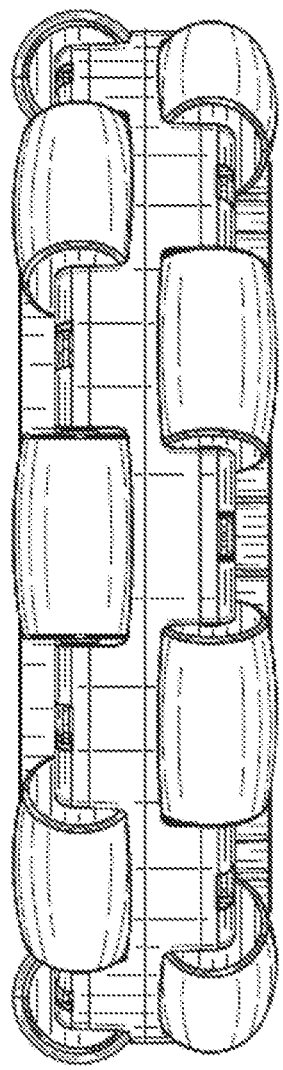
FIG. 21 is a rear view of the omni wheel.

FIG. 21 is a rear view of the omni wheel 0300.

Figure 22:
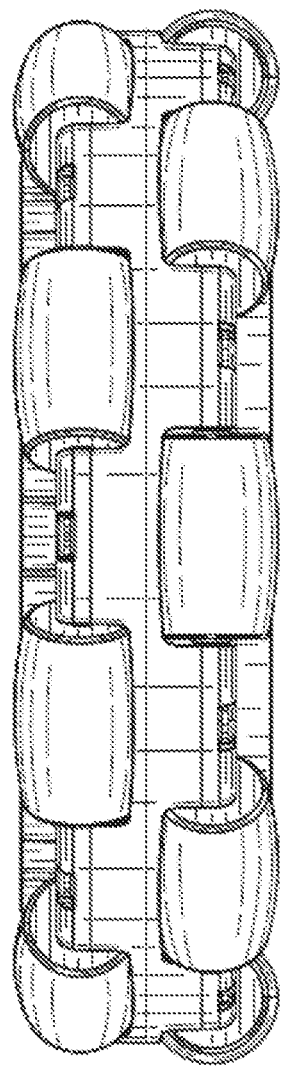
FIG. 22 is a front view of the omni wheel.

FIG. 22 is a front view of the omni wheel 0300.

Figure 23:
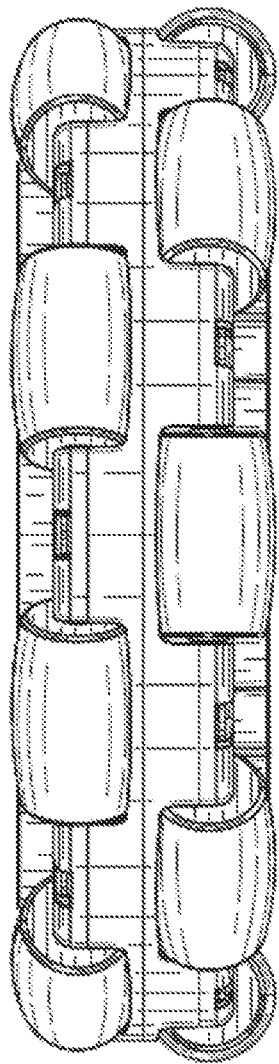
FIG. 23 is a top view of the omni wheel.

FIG. 23 is a top view of the omni wheel 0300.

Figure 24:
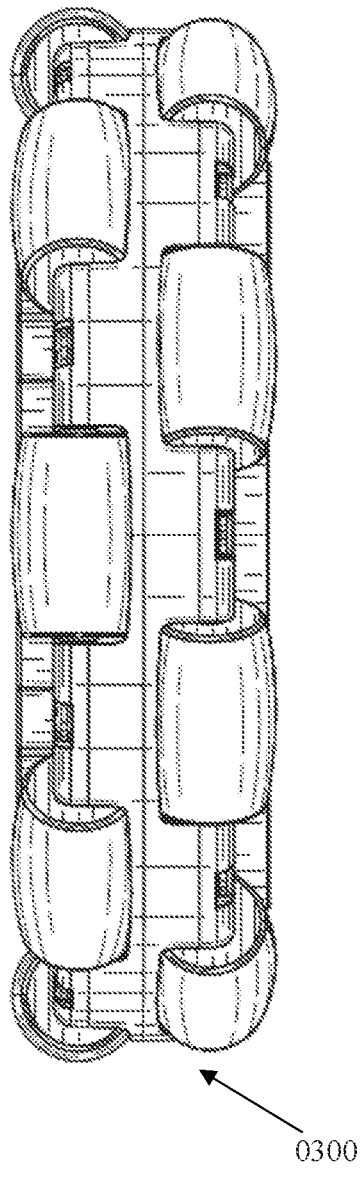
FIG. 24 is a bottom view of the omni wheel.

FIG. 24 is a bottom view of the omni wheel 0300.

Figure 25:
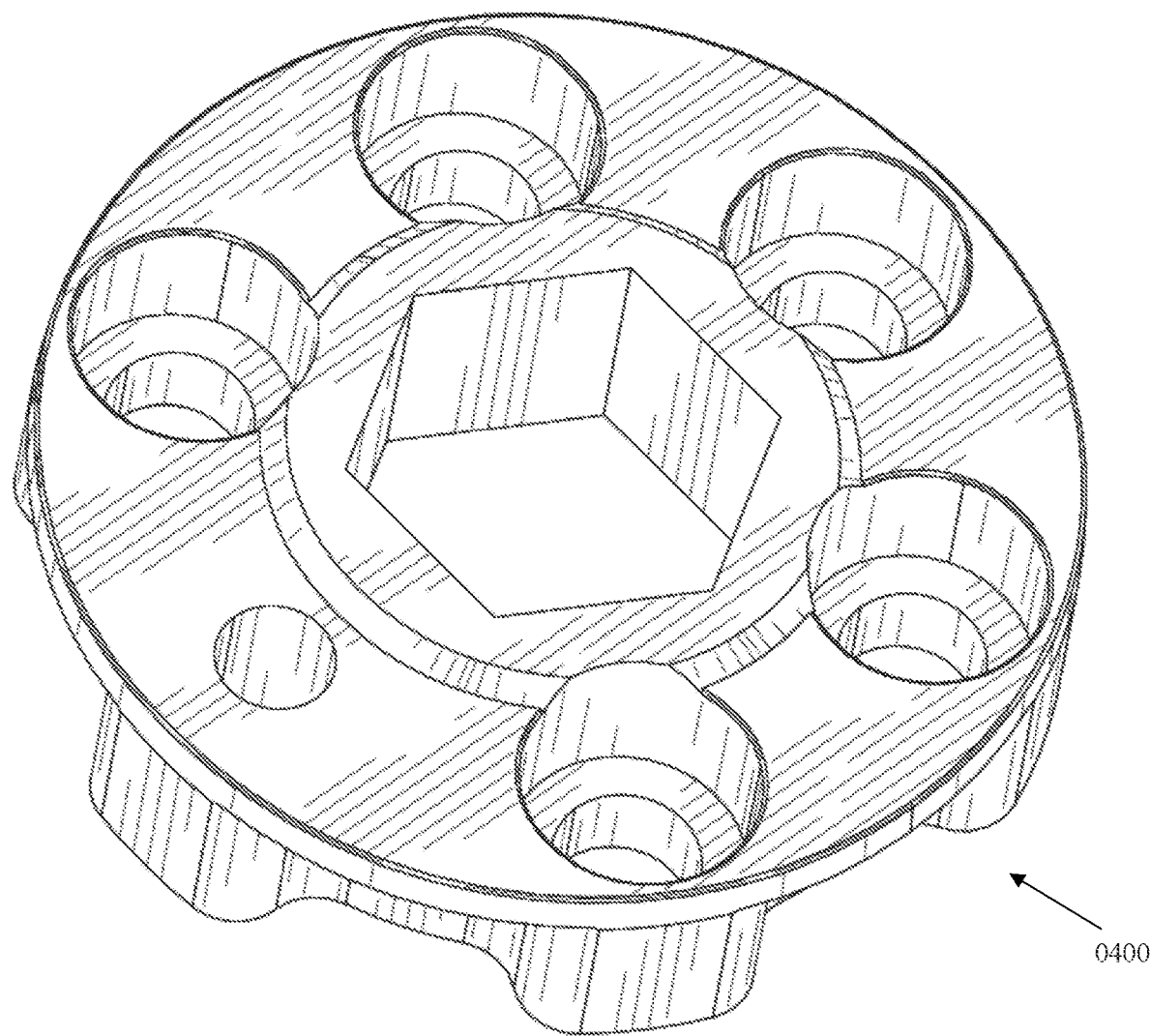
FIG. 25 is a perspective view taken from the front, the top and the right of an example of an apertured article that is also an insertion article in the form of a hub.

FIG. 25 is a perspective view taken from the front, the top and the right of an example of an apertured article that is also an insertion article in the form of a hub 0400.

Figure 26:
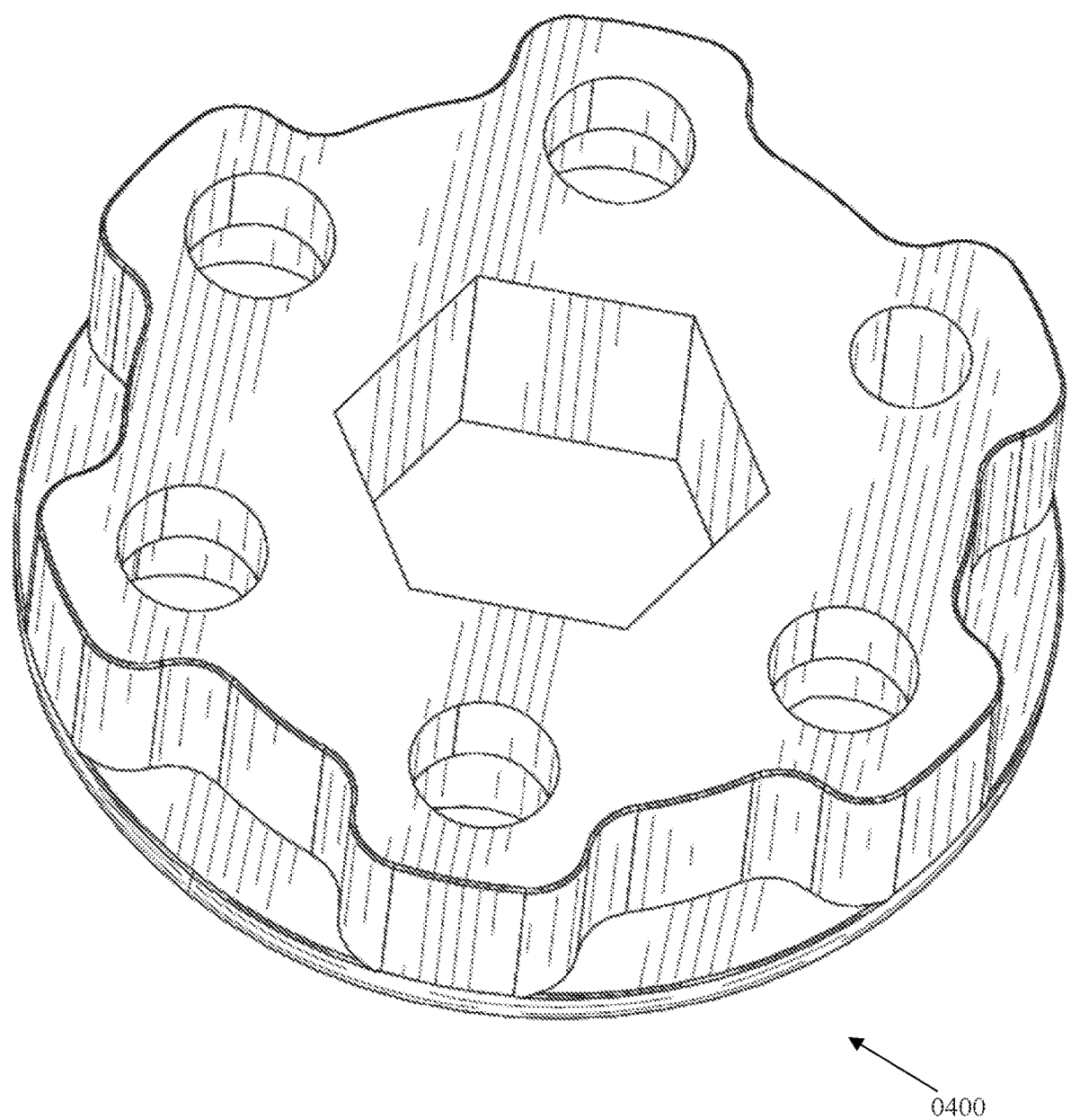
FIG. 26 is a perspective view taken from the rear, the bottom and the right of the hub.

FIG. 26 is a perspective view taken from the rear, the bottom and the right of the hub 0400.

Figure 27:
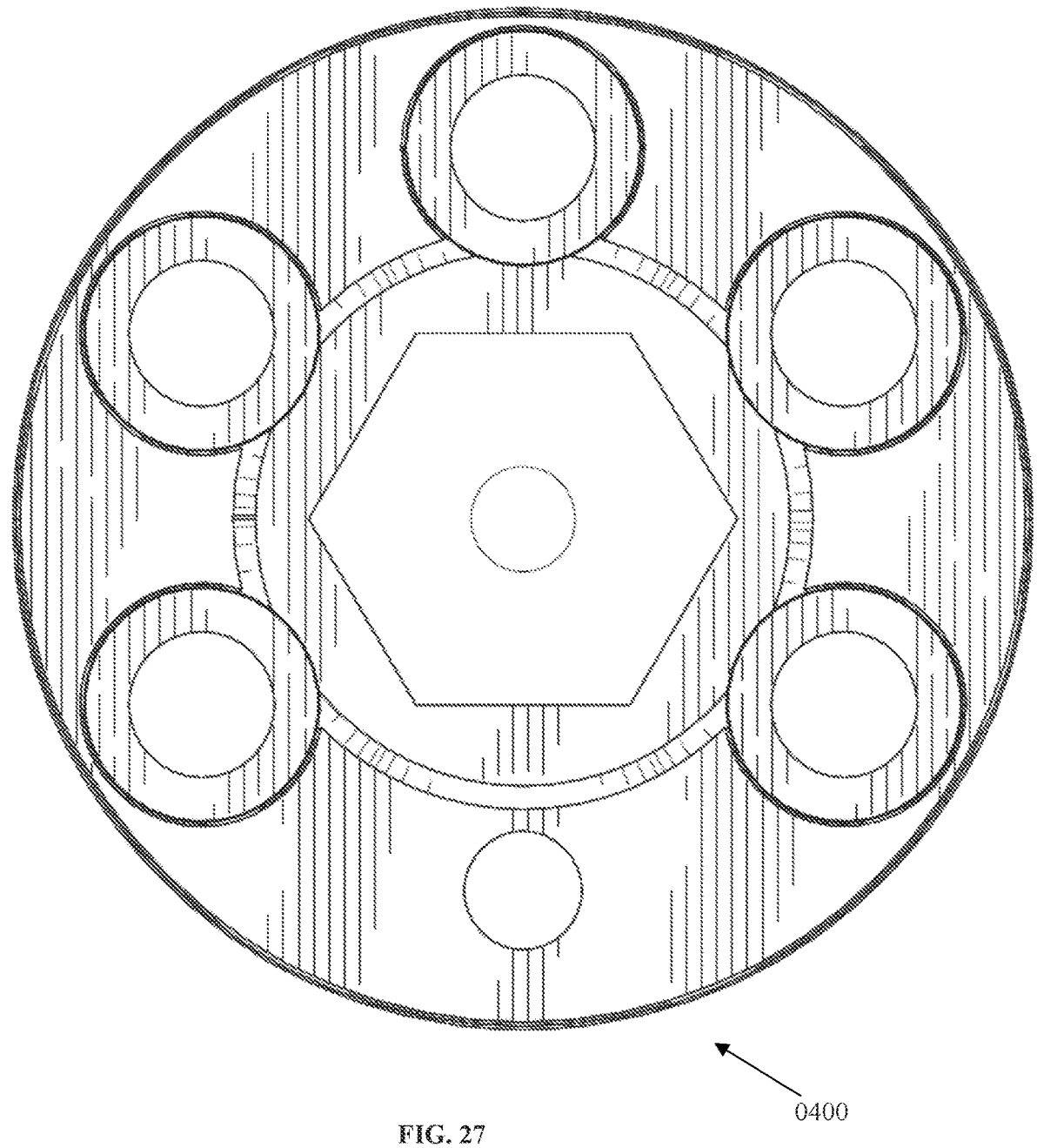
FIG. 27 is a top view of the hub.

FIG. 27 is a top view of the hub 0400.

Figure 28:
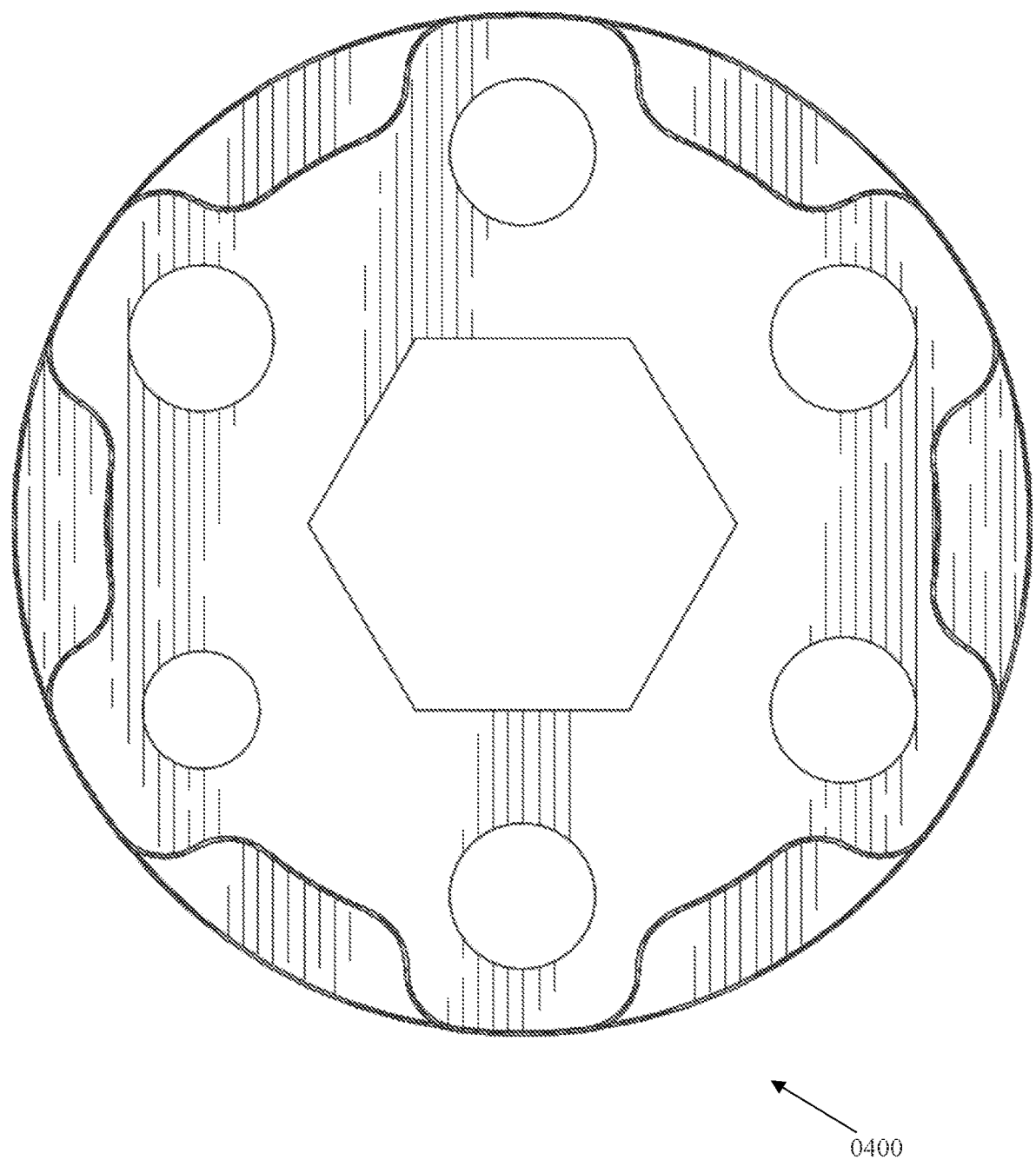
FIG. 28 is a bottom view of the hub.

FIG. 28 is a bottom view of the hub 0400.

Figure 29:
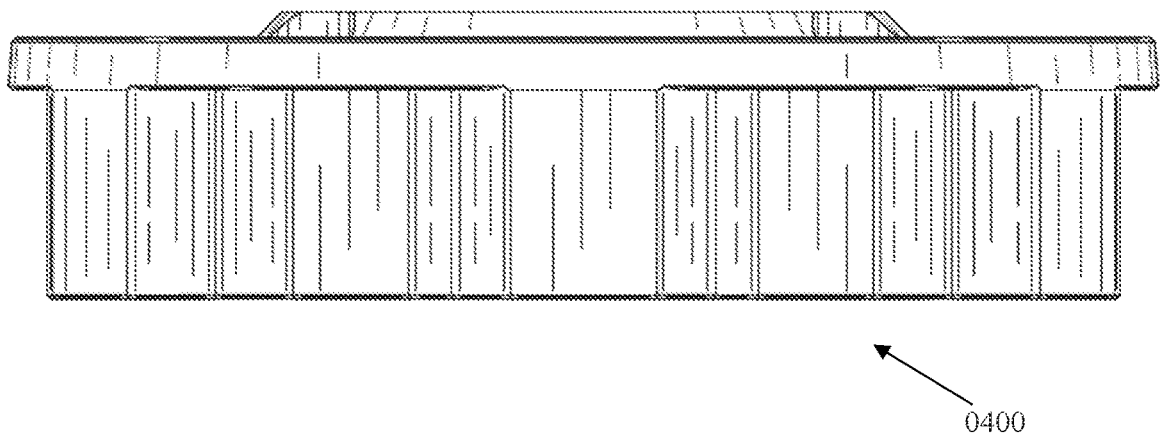
FIG. 29 is a front view of the hub.

FIG. 29 is a front view of the hub 0400.

Figure 30:
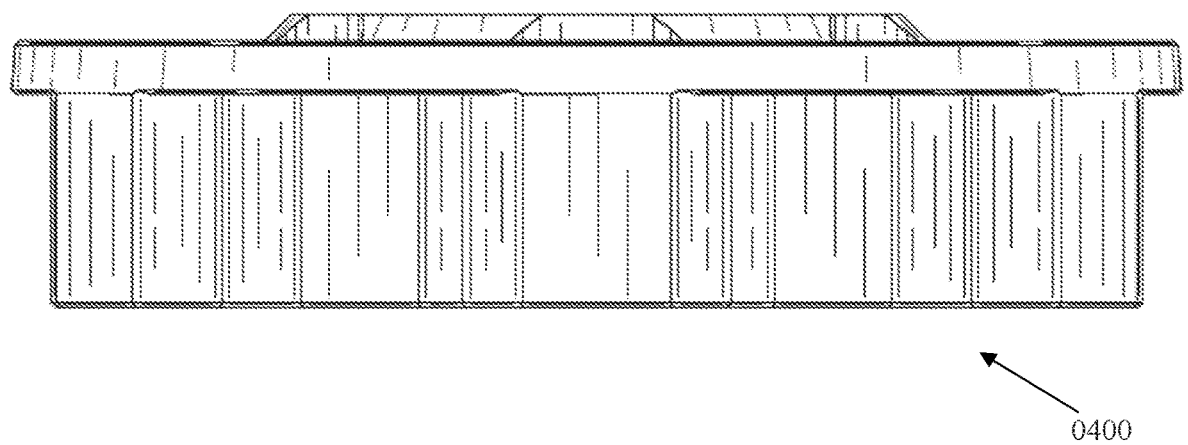
FIG. 30 is a rear view of the hub.

FIG. 30 is a rear view of the hub 0400.

Figure 31:
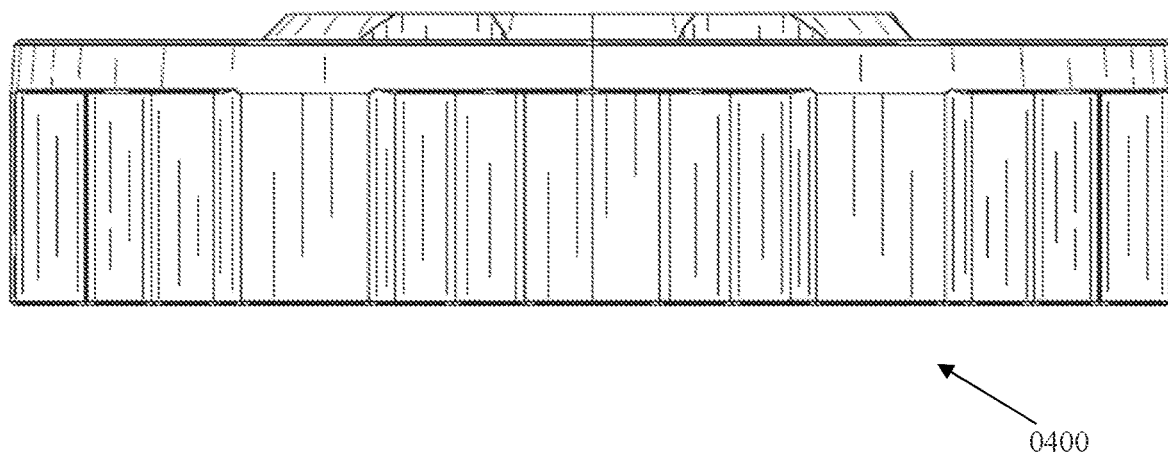
FIG. 31 is a left side view of the hub.

FIG. 31 is a left side view of the hub 0400.

Figure 32:
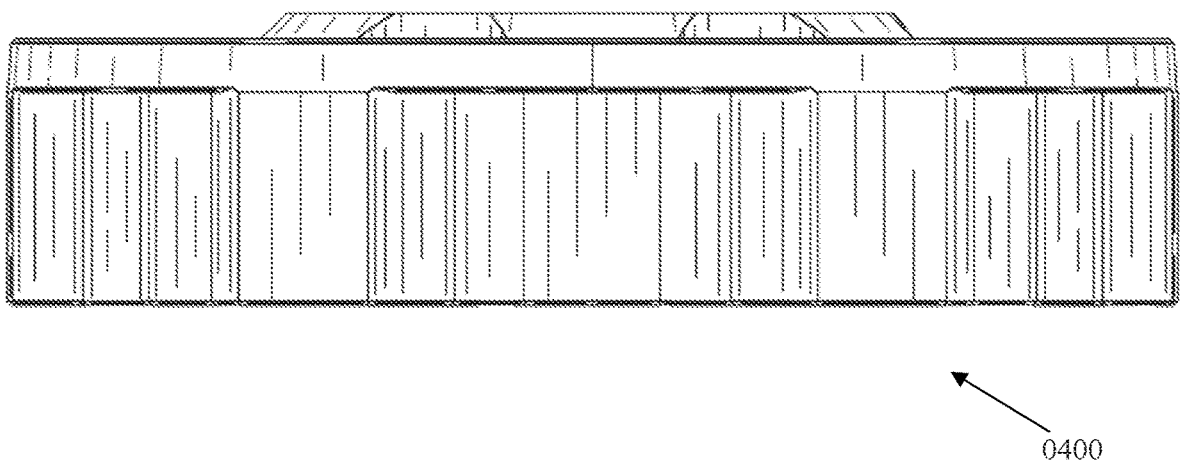
FIG. 32 is a right side view of the hub.

FIG. 32 is a right side view of the hub 0400.

FIGS. 33-79 depict illustrative examples of apertured articles having article apertures, and starting with FIG. 33 each set of three consecutively numbered FIGURES illustrate a single embodiment of an apertured article as depicted in a front-right perspective view, a front view, and a right side view, respectively; FIGS. 51-79 also depict illustrative examples of insertion articles that can be inserted into and engage with an appropriately configured apertured article; FIGS. 33-41 and 45-50 depict plates 0600; FIGS. 42-44 depict an example of a mount comprising plates 0600; FIGS. 45-46 depict an example of a tube tee 0600; FIGS. 51-56 depict examples of tubes and/or extruded articles 0800; FIGS. 54-56 depict examples of rollers 0800; FIGS. 57-59 depict a an example of a hub shaft collar with holes 0800; FIGS. 60-62 depict an example of a gear 0800; FIGS. 63-71 depict examples of sprocket wheels 0800; FIGS. 66-71 depict examples of plate sprocket wheels 0800; FIGS. 72-74 depict examples of pulley 0800; and FIGS. 75-79 depict examples of tubes and/or extruded articles 0800 which can have circular apertures.

FIGS. 89a-106b depict illustrative examples of apertured articles, and each pair of FIGURES with the same number before the letter a or b illustrates a single embodiment of an apertured article as depicted in a front-top-right perspective view and a front view, respectively; FIGS. 89a-95a also depict illustrative examples of wheels 0900; FIGS. 89a-90b also depict illustrative examples of wheels having tread patterns along an outer circumference of the wheel 0900; FIGS. 91a-94b also depict illustrative examples of wheels having a smooth outer circumference 0900; FIGS. 95a-96b also depict illustrative examples of omni wheels 0900; FIGS. 97a-b also depict an illustrative example of a tube 0900; FIGS. 98a-b and 100a-b also depict illustrative examples of plates 0900; FIGS. 99a-b also depict an illustrative example of a mount 0900; FIGS. 102a-b also depict an illustrative example of a plate sprocket wheel 0900; FIGS. 103a-b also depict an illustrative example of a sprocket wheel 0900; FIGS. 104a-b also depict an illustrative example of a gear 0900; FIGS. 105a-b also depict an illustrative example of a shaft collar 0900; FIGS. 106a-b also depict an illustrative example of a spacer 0900, for example, which can be placed between two other articles to separate the two other articles, for example, tubes, extruded articles, insertion articles, apertured articles or any combination thereof.

ADDITIONAL EMBODIMENTS

The following clauses include descriptive embodiments that are offered as further disclosure of embodiments of apertured articles, insertion articles, and associated systems. Although drawing reference numbers may be included in this Additional Embodiments section, these drawing reference numbers provide examples of the elements recited in this section, but do not limit the features illustrated by the drawing reference numbers.
1. An apertured article (e.g., component of a robot) comprising:
   an article aperture;
   optionally wherein the article aperture comprises an aperture periphery, and optionally the aperture periphery comprises an aperture inner periphery and spaced aperture protrusions (e.g., recesses of the apertured article) that extend radially outwardly from the aperture inner periphery to an aperture outer periphery;
   optionally wherein the aperture outer periphery is defined by distal edges of the spaced aperture protrusions; and
   optionally wherein the aperture inner periphery is positioned along (e.g., following precisely, or intersecting, or tangential to, or any combination thereof) the circumference of an inner aperture reference circle, and optionally the aperture outer periphery is positioned along (e.g., following precisely, or intersecting, or tangential to, or any combination thereof) the circumference of an outer aperture reference circle (e.g., concentric with the inner aperture reference circle and/or having a radius that is greater than the radius of the inner aperture reference circle).
2. The apertured article of any preceding clause, the apertured article comprising at least one feature selected from the following group of features:
the apertured article comprises any feature or combination of features of an apertured article described in this disclosure;
the article aperture comprises any feature or combination of features of an aperture (e.g., article aperture) described in this disclosure;
the apertured article is an insertion article (e.g., configured to be inserted into another apertured article (e.g., an apertured article described in this disclosure, an apertured article comprising an article aperture having a cylindrical cross-section, an apertured article comprising an article aperture having a polygonal cross-section, or any combination thereof), optionally the apertured article having any feature or combination of features of any insertion article described in this disclosure;
the apertured article has an even number of the aperture protrusions (e.g., spaced aperture protrusions, for example, evenly spaced aperture protrusions);
the apertured article has an odd number of the aperture protrusions (e.g., spaced aperture protrusions, for example, evenly spaced aperture protrusions);
the inner aperture reference circle inscribes the aperture periphery (e.g., the aperture inner periphery);
as viewed along a radial line whose origin is at the center of the inner aperture reference circle, the aperture inner periphery is positioned along the the circumference of the inner aperture reference circle 0110 for a distance equal to no more than 0.25, 0.30, 0.35, 0.40, 0.45, 0.50, 0.55, 0.60, 0.65, 0.70, or 0.75 of the entire circumference of the inner aperture reference circle; at least 0.25, 0.30, 0.35, 0.40, 0.45, 0.50, 0.55, 0.60, 0.65, 0.70, or 0.75 of the entire circumference of the inner aperture reference circle; or any combination thereof,
the aperture inner periphery (or a first and/or second aperture inner periphery) is deemed to be positioned along the circumference of the inner aperture reference circle (or a first and/or second inner aperture reference circle) when the aperture inner periphery (or a first and/or second aperture inner periphery) is spaced from the circumference of the inner aperture reference circle 0110 (or a first and/or second inner aperture reference circle) by a distance of no more than 0.75, 0.70, 0.65, 0.60, 0.55, 0.5, 0.45, 0.4, 0.35, 0.3, 0.25, 0.2, 0.15, 0.1, 0.09, 0.08, 0.07, 0.06, 0.5, 0.45, 0.4, 0.35, 0.3, 0.25, 0.2, 0.15, 0.1, 0.09, 0.08, 0.07, 0.06, 0.05, 0.04, 0.03, 0.02, 0.01 or 0 of the length of the radius of the inner aperture reference circle (or a first and/or second inner aperture reference circle);
the aperture comprising an aperture axis that is a rotational axis of symmetry of the aperture, a reflection axis of symmetry (e.g., an axis across which reflection symmetry is exhibited) of the aperture, an axis along which the aperture is configured to receive an insertion article or any combination thereof,
the aperture protrusions form a shape that is symmetrical across at least one reference line;
the aperture protrusions form a shape that is symmetrical across a rotational axis of symmetry;
the article aperture comprises at least 3, 4, 5, 6, 7, or 8 aperture protrusions, no more than 3, 4, 5, 6, 7, or 8 aperture protrusions; or any combination thereof;
the aperture inner periphery 0106 is located on the inner aperture reference circle 0110;
the aperture inner periphery 0106 consists of the portions of the aperture periphery 0104 located on or within a set distance from the inner aperture reference circle 0110, the set distance equal to no more than 0.75, 0.70, 0.65, 0.60, 0.55, 0.5, 0.45, 0.4, 0.35, 0.3, 0.25, 0.2, 0.15, 0.1, 0.09, 0.08, 0.07, 0.06, 0.05, 0.04, 0.03, 0.02, 0.01 or 0 of the radius of the inner aperture reference circle 0110; at least 0.75, 0.70, 0.65, 0.60, 0.55, 0.5, 0.45, 0.4, 0.35, 0.3, 0.25, 0.2, 0.15, 0.1, 0.09, 0.08, 0.07, 0.06, 0.05, 0.04, 0.03, 0.02, 0.01 or 0 of the radius of the inner aperture reference circle 0110; or any combination thereof;

all points on the aperture inner periphery are located on the inner aperture reference circle;

the aperture inner periphery 0106 is located on an inner reference polygon that circumscribes the inner aperture reference circle 0110;

all points on the aperture inner periphery are located on an inner reference polygon that circumscribes the inner aperture reference circle; optionally the inner reference polygon is symmetrical across at least one reference line; and optionally the inner reference polygon is symmetrical across a rotational axis of symmetry;

the entire apertured article or at least a portion of the apertured article is configured to be rotatable around or to rotate around an article axis of rotation that passes through the article aperture;

the apertured article is configured to be modular or interchangeable with at least one other article in a system;

the apertured article is configured to provide torque transfer (e.g., transfer torque from or to an insertion article configured to be inserted into the article aperture and/or coupled with (e.g., mated with, engaged with) the article aperture), provide bearing support, act as a bearing (e.g., an article in which another article turns or slides or an article that supports another article, a portion of an article that supports another portion of the article, or any combination thereof), or any combination thereof, inner peripheral surfaces of the apertured article define the aperture inner periphery and are configured to act as a bearing for an insertion article positioned in contact with the inner peripheral surfaces of the apertured article;

aperture protrusion surfaces of the apertured article define the spaced aperture protrusions and are configured to provide torque transfer from or to an insertion article positioned in contact with the aperture protrusion surfaces of the apertured article;

the apertured article is configured (i) to facilitate torque transfer to, from, or to and from an insertion article or axle that shares an axis of rotation with the apertured article optionally without requiring the insertion article or axle to be directly or indirectly coupled (e.g., fixed, mated, bolted, screwed, clipped, glued, magnetically attracted, or any combination thereof) to one or more locations on a face of the apertured article, (ii) so that the effective thickness of the apertured article along an axis of rotation of the apertured article does not need to be increased to facilitate torque transfer to, from, or to and from an insertion article or axle that shares an axis of rotation with the apertured article, (iii) so that the apertured article can be coupled to an insertion article or an axle such that a comparative circumscribing cylinder has a height that is optionally at least 1 times the height of an apertured article circumscribing cylinder, and that is optionally no more than 1, 1.01, 1.02, 1.03, 1.04, 1.05, 1.06, 1.07, 1.08, 1.09, 1.1, 1.15, 1.2, 1.25, 1.3, 1.35, 1.4, 1.45, or 1.5 times the height of the apertured article circumscribing cylinder, wherein the comparative circumscribing cylinder circumscribes a rotational path traced by a combination of components comprising the apertured article (e.g., the insertion article, the axle, the apertured article, any coupling components used to couple the insertion article or axle to the apertured article, any components fixed to and rotating with the apertured article, or any combination thereof) during a complete rotation of the combination of components around an axis of rotation of the apertured article, and wherein the apertured article circumscribing cylinder circumscribes a rotational path traced by the apertured article during a complete rotation of only the apertured article around an axis of rotation of the apertured article; or (iv) any combination thereof;

the apertured article is configured to be a socket, optionally a universal socket (e.g., capable of mating with any insertion article or or any combination of insertion articles described in this disclosure);

the apertured article is configured to be compatible with (e.g., able to be mated with, directly mated with, indirectly mated with, capable of receiving into the article aperture, or any combination thereof) other articles (e.g., an insertion article or insertion articles) having either a circular exterior cross-section, a polygonal exterior cross-section (e.g., a hexagonal exterior cross-section), or both;

the apertured article is configured: optionally (i) to receive and act as a bearing for a first insertion article configured to engage surfaces of the apertured article along the aperture inner periphery, optionally the first insertion article having a circular exterior cross-section or a polygonal exterior cross-section; and optionally (ii) to receive and transfer torque from or to a second insertion article configured or having an exterior cross-section configured to engage surfaces of the apertured article along the spaced aperture protrusions; optionally the first insertion article and the second insertion article are the same insertion article;

the apertured article is configured to be used with or to be capable of being used with a live axle, a dead axle, or any combination thereof, the apertured article is configured to engage (be coupled to, be fixed to, mate with, receive, or any combination thereof) and rotate with a live axle around an axis of rotation, optionally the axis of rotation is oriented along or concentric with the live axle);

the apertured article is configured to engage (be coupled to, be fixed to, mate with, receive, or any combination thereof) a dead axle and rotate around the dead axle or an axis of rotation, optionally the axis of rotation is oriented along or concentric with the dead axle;

the apertured article is configured to provide or to have the ability to provide torque transfer, to provide bearing support, to act as a bearing (e.g., an article in which another article turns or slides or an article that supports another article, a portion of an article that supports another portion of the article, or any combination thereof), or a combination thereof, the apertured article is configured to be interchangeable with other articles (e.g., apertured articles comprising a selected characteristic of, any combination of selected characteristics of, or all of the characteristics of any apertured article described in this disclosure); combinable with other articles (e.g., insertion articles comprising a selected characteristic of, any combination of selected characteristics of, or all of the characteristics of any insertion article described in this disclosure); or any combination thereof;

the apertured article is configured to rotate around a live axle, rotate around a dead axle, or fix the position of one element relative to another component in a radial direction, in an axial direction, around a rotational axis in a rotational direction, or any combination thereof;

the apertured article comprises or is a robotic component, a tube, a rectangular tube, a cylindrical tube, a channel, a plate, a mount, a tube tee, an extruded component, a roller, a spacer, a shaft collar, a shaft spacer, a wheel, an omni wheel, a gear, a sprocket wheel, a pulley, a gear box, or any combination thereof;

the apertured article is configured to provide torque transfer, support a bearing, rotate around a live axle, rotate around a dead axle, fix the position of the apertured article relative to another article in a radial direction, fix the position of the apertured article relative to another article in an axial direction, fix the position of the apertured article relative to another article around a rotational axis in a rotational direction, or any combination thereof;

the apertured article comprises or is a robotic component, a tube, a tube having a rectangular exterior cross-section, a cylindrical tube, a connector, a hub (e.g., wheel hub), a channel, a plate, a mount, a tube tee, an extruded component, a roller, a spacer, a shaft collar, a shaft spacer, a wheel, an omni wheel, a gear, a sprocket, a pulley, a gear box, or any combination thereof;

the apertured article is configured to be manufactured by being extruded, being cut from a bulk material, being stamped from a bulk material, being injection moulded, being milled, being made using a computer numerical control (CNC) machine, being made without requiring a sharp or angled cut, being made with only curved cuts, or any combination thereof;

the apertured article is configured to have a set of edges in a plane (e.g., perpendicular to a direction of extrusion of the apertured article or in a plane perpendicular to an axis of rotation of the apertured article), all of the edges in the set of edges being rounded (e.g., all the edges of the object in the plane being rounded), optionally all the edges in the set of edges having a diameter of curvature of at least 3, 3.5, 4, 4.5, or 5 mm (e.g., having a radius of curvature of at least 1.5, 1.75, 2, 2.25, or 2.5 mm);

the apertured article comprises or is made of a polymer, a plastic, a rubber, a resin, a metal, an alloy, wood, carbon fiber, a composite, or any combination thereof;

the exterior of the apertured article is circumscribed by a cylinder that is at least 2, 2.1, 2.2, 2.3, 2.4, 2.5, 2.6, 2.7, 2.8, 2.9, 3, 3.1, 3.2, 3.3, 3.4, 3.5, 4, 4.5, 5, 5.5, 6, 6.5, 7, 7.5, 8, 8.5, 9, 9.5 or 10 inches in diameter; no more than 2, 2.1, 2.2, 2.3, 2.4, 2.5, 2.6, 2.7, 2.8, 2.9, 3, 3.1, 3.2, 3.3, 3.4, 3.5, 4, 4.5, 5, 5.5, 6, 6.5, 7, 7.5, 8, 8.5, 9, 9.5 or 10 inches in diameter; at least 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 3, 4, 5, 6, 7, 8, 9, 10, 20, 30, 40, 50, 60, 70, or 80 inches in height (e.g., as measured perpendicular to the diameter); no more than 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 3, 4, 5, 6, 7, 8, 9, 10, 20, 30, 40, 50, 60, 70, or 80 inches in height (e.g., as measured perpendicular to the diameter); or any combination thereof;

the exterior of the apertured article is circumscribed by a rectangular prism that is at least 2, 2.1, 2.2, 2.3, 2.4, 2.5, 2.6, 2.7, 2.8, 2.9, 3, 3.1, 3.2, 3.3, 3.4, 3.5, 4, 4.5, 5, 5.5, 6, 6.5, 7, 7.5, 8, 8.5, 9, 9.5 or 10 inches in height (e.g., as measured perpendicular to the width and/or length); no more than 2, 2.1, 2.2, 2.3, 2.4, 2.5, 2.6, 2.7, 2.8, 2.9, 3, 3.1, 3.2, 3.3, 3.4, 3.5, 4, 4.5, 5, 5.5, 6, 6.5, 7, 7.5, 8, 8.5, 9, 9.5 or 10 inches in height (e.g., as measured perpendicular to the width and/or length); at least 2, 2.1, 2.2, 2.3, 2.4, 2.5, 2.6, 2.7, 2.8, 2.9, 3, 3.1, 3.2, 3.3, 3.4, 3.5, 4, 4.5, 5, 5.5, 6, 6.5, 7, 7.5, 8, 8.5, 9, 9.5 or 10 inches in width (e.g., as measured perpendicular to the height and/or length); no more than 2, 2.1, 2.2, 2.3, 2.4, 2.5, 2.6, 2.7, 2.8, 2.9, 3, 3.1, 3.2, 3.3, 3.4, 3.5, 4, 4.5, 5, 5.5, 6, 6.5, 7, 7.5, 8, 8.5, 9, 9.5 or 10 inches in width (e.g., as measured perpendicular to the height and/or length); at least 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 3, 4, 5, 6, 7, 8, 9, 10, 20, 30, 40, 50, 60, 70, or 80 inches in length (e.g., as measured perpendicular to the height and/or width); no more than 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 3, 4, 5, 6, 7, 8, 9, 10, 20, 30, 40, 50, 60, 70, or 80 inches in length (e.g., as measured perpendicular to the height and/or width); or any combination thereof;

the article aperture of the apertured article is circumscribed by a cylinder that is at least 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 4, 4.5, 5, 5.5, 6, 6.5, 7, 7.5, 8, 8.5, 9, 9.5 or 10 inches in diameter; no more than 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 4, 4.5, 5, 5.5, 6, 6.5, 7, 7.5, 8, 8.5, 9, 9.5 or 10 inches in diameter; at least 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 3, 4, 5, 6, 7, 8, 9, 10, 20, 30, 40, 50, 60, 70, or 80 inches in height (e.g., as measured perpendicular to the diameter); no more than 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 3, 4, 5, 6, 7, 8, 9, 10, 20, 30, 40, 50, 60, 70, or 80 inches in height (e.g., as measured perpendicular to the diameter); or any combination thereof;

the article aperture of the apertured article is circumscribed by a rectangular prism that is at least 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 4, 4.5, 5, 5.5, 6, 6.5, 7, 7.5, 8, 8.5, 9, 9.5 or 10 inches in height (e.g., as measured perpendicular to the width and/or length); no more than 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 4, 4.5, 5, 5.5, 6, 6.5, 7, 7.5, 8, 8.5, 9, 9.5 or 10 inches in height (e.g., as measured perpendicular to the width and/or length); at least 2, 2.1, 2.2, 2.3, 2.4, 2.5, 2.6, 2.7, 2.8, 2.9, 3, 3.1, 3.2, 3.3, 3.4, 3.5, 4, 4.5, 5, 5.5, 6, 6.5, 7, 7.5, 8, 8.5, 9, 9.5 or 10 inches in width (e.g., as measured perpendicular to the height and/or length); no more than 2, 2.1, 2.2, 2.3, 2.4, 2.5, 2.6, 2.7, 2.8, 2.9, 3, 3.1, 3.2, 3.3, 3.4, 3.5, 4, 4.5, 5, 5.5, 6, 6.5, 7, 7.5, 8, 8.5, 9, 9.5 or 10 inches in width (e.g., as measured perpendicular to the height and/or length); at least 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 3, 4, 5, 6, 7, 8, 9, 10, 20, 30, 40, 50, 60, 70, or 80 inches in length (e.g., as measured perpendicular to the height and/or width); no more than 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 3, 4, 5, 6, 7, 8, 9, 10, 20, 30, 40, 50, 60, 70, or 80 inches in length (e.g., as measured perpendicular to the height and/or width); or any combination thereof;

the apertured article has a plurality of holes passing through (e.g., centered around) points on the apertured article, optionally each of the points on the apertured article being located a radial distance from the axis of rotation of the apertured article or the center of an aperture of the apertured article, optionally the radial distance being 2 inches within a tolerance of plus or minus 0.1, 0.2, 0.3, 0.4, 0.5, 0.6, 0.7, 0.8, 0.9 or 1 inches;

or any combination thereof.

3. An insertion article comprising:

a body, optionally the body extends along an insertion axis of the insertion article (e.g., an axis along which the article is configured to be inserted into an aperture of an apertured article);

optionally wherein the body of the insertion article comprises a body exterior periphery, and optionally the body exterior periphery comprises a body inner exterior periphery and spaced body protrusions that extend radially outwardly from the body inner exterior periphery to a body outer exterior periphery;

optionally wherein the outer exterior periphery is defined by distal edges of the spaced body protrusions; and optionally wherein the body inner exterior periphery is positioned along (e.g., following precisely, or intersecting, or tangential to, or any combination thereof) the circumference of an inner body reference circle, and optionally the body outer exterior periphery is positioned along (e.g., following precisely, or intersecting, or tangential to, or any combination thereof) the circumference of an outer body reference circle (e.g., concentric with the inner body reference circle and/or having a radius that is greater than the radius of the inner body reference circle).

4. The insertion article of any preceding clause, the insertion article comprising at least one feature selected from the following group of features:

the insertion article comprises any feature or combination of features of an insertion article described in this disclosure;

the insertion article is configured to engage with (e.g., be inserted into, be coupled with, mate with, be in contact (e.g., frictionally engaged contact, slidably, nonslidably or any combination thereof) with, be fixed to (e.g., relative fixed in a radial direction, along an axis of rotation, in a direction of rotation, or any combination thereof) or any combination thereof) an apertured article of any preceding clause (e.g., a first apertured article);

the insertion article comprises or is an apertured body, optionally the apertured body having any feature or combination of features described in this disclosure for an apertured article, optionally the apertured body comprising an aperture having any feature or combination of features described in this disclosure for an aperture (e.g., article aperture) of an apertured article;

the insertion article is or comprises an apertured article of any preceding clause (e.g., a second apertured article), optionally the insertion article is configured to be inserted into an apertured article of any preceding clause (e.g., a first apertured article);

the exterior periphery of the insertion article is configured to mate with the article aperture of an apertured article (e.g., the apertured article of any preceding clause), optionally the insertion article comprises a body aperture (e.g., comprising any feature or combination of features of an aperture (e.g., the article aperture) of any apertured article of any preceding clause); optionally the insertion article is configured to connect an apertured article with an additional insertion article (e.g., article that can be inserted into the body aperture, article that mates with the body aperture, or any combination thereof);

the insertion article has an even number of the body protrusions (e.g., spaced body protrusions, for example, evenly spaced body protrusions);

the insertion article has an odd number of the body protrusions (e.g., spaced body protrusions, for example, evenly spaced body protrusions);

the body inner aperture reference circle inscribes the aperture periphery (e.g., the aperture inner periphery);

the inner body reference circle inscribing the body exterior periphery (e.g., the body inner exterior periphery);

as viewed along a radial line whose origin is at the center of the inner body reference circle, the body inner exterior periphery is positioned along the the circumference of the inner body reference circle for a distance equal to no more than 0.25, 0.30, 0.35, 0.40, 0.45, 0.50, 0.55, 0.60, 0.65, 0.70, or 0.75 of the entire circumference of the inner body reference circle; at least 0.25, 0.30, 0.35, 0.40, 0.45, 0.50, 0.55, 0.60, 0.65, 0.70, or 0.75 of the entire circumference of the inner body reference circle; or any combination thereof;

the body inner exterior periphery is deemed to be positioned along the circumference of the inner body reference circle when the body inner exterior periphery is spaced from the circumference of the inner body reference circle by a distance of no more than 0.75, 0.70, 0.65, 0.60, 0.55, 0.5, 0.45, 0.4, 0.35, 0.3, 0.25, 0.2, 0.15, 0.1, 0.09, 0.08, 0.07, 0.06, 0.5, 0.45, 0.4, 0.35, 0.3, 0.25, 0.2, 0.15, 0.1, 0.09, 0.08, 0.07, 0.06, 0.05, 0.04, 0.03, 0.02, 0.01, or 0 of the length of the radius of the inner body reference circle;

the body comprising a body axis that is a rotational axis of symmetry of the body, a reflection axis of symmetry (e.g., an axis across which reflection symmetry is exhibited) of the body, an axis along which the body is configured to be inserted into an apertured article or any combination thereof, the body protrusions form a shape that is symmetrical across at least one reference line;

the body protrusions form a shape that is symmetrical across a rotational axis of symmetry;

the body exterior periphery comprises at least 3, 4, 5, 6, 7, or 8 body protrusions, no more than 3, 4, 5, 6, 7, or 8 body protrusions; or any combination thereof, the body inner exterior periphery 0806 is located on the inner body reference circle 0810;

the body inner exterior periphery 0806 consists of the portions of the body exterior periphery 0804 located on or within a set distance from the inner body reference circle 0810, the set distance equal to no more than 0.75, 0.70, 0.65, 0.60, 0.55, 0.5, 0.45, 0.4, 0.35, 0.3, 0.25, 0.2, 0.15, 0.1, 0.09, 0.08, 0.07, 0.06, 0.05, 0.04, 0.03, 0.02, 0.01 or 0 of the radius of the inner body reference circle; at least 0.75, 0.70, 0.65, 0.60, 0.55, 0.5, 0.45, 0.4, 0.35, 0.3, 0.25, 0.2, 0.15, 0.1, 0.09, 0.08, 0.07, 0.06, 0.05, 0.04, 0.03, 0.02, 0.01 or 0 of the radius of the inner body reference circle; or any combination thereof, all points on the body inner exterior periphery are located on the inner body reference circle;

all points on the body inner exterior periphery are located on an inner reference polygon that circumscribes the inner body reference circle; optionally the inner reference polygon is symmetrical across at least one reference line; and optionally the inner reference polygon is symmetrical across a rotational axis of symmetry;

the entire insertion article or at least a portion of the insertion article is configured to be rotatable around or to rotate around an article axis of rotation that passes through the article aperture;

the insertion article is configured to be modular or interchangeable with at least one other article in a system;

the insertion article is configured to provide torque transfer, provide bearing support, to act as bearing (e.g., an article in which another article turns or slides or an article that supports another article, a portion of an article that supports another portion of the article, or any combination thereof), or any combination thereof, the body inner exterior periphery is configured so when the insertion article is positioned in contact with (e.g., inside) inner peripheral surfaces of the apertured article that define an aperture inner periphery of an apertured article, the body inner exterior periphery is supported by the inner peripheral surfaces of the apertured article (e.g, the inner peripheral surfaces of the apertured article serve as a bearing for the insertion article;

the spaced body protrusions are configured to provide torque transfer from or to an apertured article when the spaced body protrusions are positioned in contact with aperture protrusion surfaces of the apertured article that define the spaced aperture protrusions of the apertured article;

the insertion article is configured (i) to facilitate torque transfer to, from, or to and from an apertured article, another insertion article or axle that shares an axis of rotation with the insertion article optionally without requiring the apertured article, the additional insertion article or axle to be directly or indirectly coupled (e.g., fixed, mated, bolted, screwed, clipped, glued, magnetically attracted, or any combination thereof) to one or more locations on a face of the insertion article, (ii) so that the effective thickness of the insertion article along an axis of rotation of the insertion article does not need to be increased to facilitate torque transfer to, from, or to and from an apertured article, another insertion article or an axle that shares an axis of rotation with the apertured article, (iii) so that the insertion article can be coupled to an apertured article, another insertion article or an axle such that a comparative circumscribing cylinder has a height that is optionally at least 1 times the height of an insertion article circumscribing cylinder, and that is optionally no more than 1, 1.01, 1.02, 1.03, 1.04, 1.05, 1.06, 1.07, 1.08, 1.09, 1.1, 1.15, 1.2, 1.25, 1.3, 1.35, 1.4, 1.45, or 1.5 times the height of the insertion article circumscribing cylinder, wherein the comparative circumscribing cylinder circumscribes a rotational path traced by a combination of components comprising the insertion article (e.g., the insertion article, the axle, the apertured article, any coupling components used to couple the insertion article to the axle or the apertured article, or any combination thereof) during a complete rotation of the combination of components around an axis of rotation of the insertion article, and wherein the insertion article circumscribing cylinder circumscribes a rotational path traced by the insertion article during a complete rotation of only the insertion article around an axis of rotation of the apertured article; or (iv) any combination thereof, the insertion article is configured to be compatible with (e.g., able to be mated with, directly mated with, indirectly mated with, or any combination thereof) other articles (e.g., apertured articles) having either a circular exterior cross-section, a polygonal exterior cross-section (e.g., a hexagonal exterior cross-section), or both;

the insertion article is configured: optionally (i) to be inserted into an apertured article that is configured to receive and act as a bearing for a first insertion article (e.g., the insertion article is configured to engage surfaces of the apertured article along the aperture inner periphery), optionally the insertion article having a circular exterior cross-section or a polygonal exterior cross-section; and optionally (ii) to receive and transfer torque from or to the apertured article, optionally the insertion article configured or having an exterior cross-section configured to engage surfaces of the apertured article along the spaced aperture protrusions; optionally the first insertion article and the second insertion article are the same insertion article;

the insertion article is configured to be used with, to be capable of being used with, to be used as, to be capable of being used as, to be used as part of, or to be capable of being used as part of a live axle, a dead axle, or any combination thereof, the insertion article is an apertured article that is configured to engage (be coupled to, be fixed to, mate with, receive, or any combination thereof) and rotate with a live axle around an axis of rotation, optionally the axis of rotation is oriented along or concentric with the live axle);

the insertion article is an apertured article that is configured to engage (be coupled to, be fixed to, mate with, receive, or any combination thereof) a dead axle and rotate around the dead axle or an axis of rotation, optionally the axis of rotation is oriented along or concentric with the dead axle;

the insertion article is configured to provide or to have the ability to provide torque transfer, to provide bearing support, to act as a bearing (e.g., an article in which another article turns or slides or an article that supports another article, a portion of an article that supports another portion of the article, or any combination thereof), or a combination thereof, the insertion article is configured to be interchangeable with other articles (e.g., insertion articles comprising a selected characteristic of, any combination of selected characteristics of, or all of the characteristics of any insertion article described in this disclosure); combinable with other articles (e.g., insertion articles comprising a selected characteristic of, any combination of selected characteristics of, or all of the characteristics of any insertion article described in this disclosure); or any combination thereof;

the insertion article is configured to rotate around a live axle, rotate around a dead axle, or fix the position of one element relative to another component in a radial direction, in an axial direction, around a rotational axis in a rotational direction, or any combination thereof;

the insertion article comprises or is a robotic component, a hub (e.g., a wheel hub), a connector, a spline (e.g. a male spline), a plurality of splines (e.g., a plurality of male splines), teeth, ridges (e.g., oriented along an axis of the insertion article, for example an insertion axis of the insertion article or a longitudinal axis of the insertion article), a sprocket, a plurality of sprockets, a tube, a tube with a polygonal exterior cross-section (e.g., hexagonal), a cylindrical tube, a channel, a plate, a mount, a tube tee, an extruded component, a roller, a spacer, a shaft collar, a shaft spacer, a wheel, a gear, a sprocket wheel, a gear box, or any combination thereof;

the insertion article is configured to be inserted into an aperture of an apertured article and along an aperture axis of the aperture;

the body of the insertion article has a body axis (e.g., any axis described in this disclosure, an axis of rotation, an insertion axis along which the body is configured to be inserted into an apertured article, or any combination thereof); and optionally the insertion article is configured to be inserted into an aperture of an apertured article and along the body axis;

the insertion article comprises or is a robotic component, a tube, a rectangular tube, a cylindrical tube, a channel, a plate, a mount, a tube tee, an extruded component, a roller, a spacer, a shaft collar, a shaft spacer, a wheel, an omni wheel, a gear, a sprocket wheel, a pulley, a gear box, or any combination thereof, the insertion article is configured to provide torque transfer, support a bearing, rotate around a live axle, rotate around a dead axle, fix the position of the insertion article relative to another article in a radial direction, fix the position of the insertion article relative to another article in an axial direction, fix the position of the insertion article relative to another article around a rotational axis in a rotational direction, or any combination thereof;

the insertion article comprises or is a robotic component, a tube, a tube having a rectangular exterior cross-section, a cylindrical tube, a connector, a hub (e.g., wheel hub), a channel, a plate, a mount, a tube tee, an extruded component, a roller, a spacer, a shaft collar, a shaft spacer, a wheel, an omni wheel, a gear, a sprocket, a pulley, a gear box, or any combination thereof;

the insertion article is configured to be manufactured by being extruded, being cut from a bulk material, being stamped from a bulk material, being injection moulded, being milled, being made using a computer numerical control (CNC) machine, being made without requiring a sharp or angled cut, being made with only curved cuts, or any combination thereof, the insertion article is configured to have a set of edges in a plane (e.g., perpendicular to a direction of extrusion of the insertion article or in a plane perpendicular to an axis of rotation of the insertion article), all of the edges in the set of edges being rounded (e.g., all the edges of the object in the plane being rounded), optionally all the edges in the set of edges having a diameter of curvature of at least 3, 3.5, 4, 4.5, or 5 mm (e.g., having a radius of curvature of at least 1.5, 1.75, 2, 2.25, or 2.5 mm);

the insertion article comprises or is made of a polymer, a plastic, a rubber, a resin, a metal, an alloy, wood, carbon fiber, a composite, or any combination thereof, the exterior of the insertion article is circumscribed by a cylinder that is at least 2, 2.1, 2.2, 2.3, 2.4, 2.5, 2.6, 2.7, 2.8, 2.9, 3, 3.1, 3.2, 3.3, 3.4, 3.5, 4, 4.5, 5, 5.5, 6, 6.5, 7, 7.5, 8, 8.5, 9, 9.5 or 10 inches in diameter; no more than 2, 2.1, 2.2, 2.3, 2.4, 2.5, 2.6, 2.7, 2.8, 2.9, 3, 3.1, 3.2, 3.3, 3.4, 3.5, 4, 4.5, 5, 5.5, 6, 6.5, 7, 7.5, 8, 8.5, 9, 9.5 or 10 inches in diameter; at least 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 3, 4, 5, 6, 7, 8, 9, 10, 20, 30, 40, 50, 60, 70, or 80 inches in height (e.g., as measured perpendicular to the diameter); no more than 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 3, 4, 5, 6, 7, 8, 9, 10, 20, 30, 40, 50, 60, 70, or 80 inches in height (e.g., as measured perpendicular to the diameter); or any combination thereof, the exterior of the insertion article is circumscribed by a rectangular prism that is at least 2, 2.1, 2.2, 2.3, 2.4, 2.5, 2.6, 2.7, 2.8, 2.9, 3, 3.1, 3.2, 3.3, 3.4, 3.5, 4, 4.5, 5, 5.5, 6, 6.5, 7, 7.5, 8, 8.5, 9, 9.5 or 10 inches in height (e.g., as measured perpendicular to the width and/or length); no more than 2, 2.1, 2.2, 2.3, 2.4, 2.5, 2.6, 2.7, 2.8, 2.9, 3, 3.1, 3.2, 3.3, 3.4, 3.5, 4, 4.5, 5, 5.5, 6, 6.5, 7, 7.5, 8, 8.5, 9, 9.5 or 10 inches in height (e.g., as measured perpendicular to the width and/or length); at least 2, 2.1, 2.2, 2.3, 2.4, 2.5, 2.6, 2.7, 2.8, 2.9, 3, 3.1, 3.2, 3.3, 3.4, 3.5, 4, 4.5, 5, 5.5, 6, 6.5, 7, 7.5, 8, 8.5, 9, 9.5 or 10 inches in width (e.g., as measured perpendicular to the height and/or length); no more than 2, 2.1, 2.2, 2.3, 2.4, 2.5, 2.6, 2.7, 2.8, 2.9, 3, 3.1, 3.2, 3.3, 3.4, 3.5, 4, 4.5, 5, 5.5, 6, 6.5, 7, 7.5, 8, 8.5, 9, 9.5 or 10 inches in width (e.g., as measured perpendicular to the height and/or length); at least 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 3, 4, 5, 6, 7, 8, 9, 10, 20, 30, 40, 50, 60, 70, or 80 inches in length (e.g., as measured perpendicular to the height and/or width); no more than 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 3, 4, 5, 6, 7, 8, 9, 10, 20, 30, 40, 50, 60, 70, or 80 inches in length (e.g., as measured perpendicular to the height and/or width); or any combination thereof, the insertion article has a plurality of holes passing through (e.g., centered around) points on the insertion article, optionally each of the points on the insertion article being located a radial distance from the axis of rotation of the insertion article or the center of an aperture of the insertion article, optionally the radial distance being 2 inches within a tolerance of plus or minus 0.1, 0.2, 0.3, 0.4, 0.5, 0.6, 0.7, 0.8, 0.9 or 1 inches;

or any combination thereof.

5. A system (e.g., robotic system, robot, or any combination thereof) comprising the apertured article of any preceding clause, a plurality of apertured articles wherein each of the plurality of apertured articles is an apertured article of any preceding clause, the insertion article of any preceding clause, a plurality of insertion articles wherein each of the plurality of insertion articles is an insertion article of any preceding clause, an additional insertion article, or any combination thereof, the system optionally comprising at least one feature selected from the following group of features:

any object or article described in this disclosure;

any feature of an object or article described in this disclosure;

any feature of a system described in this disclosure;

a plurality of apertured articles comprising the apertured article of any preceding clause, each of the plurality of apertured articles having a characteristic or selection of characteristics of the apertured article;

a plurality of insertion articles comprising the insertion article of any preceding clause, each of the plurality of insertion articles having a characteristic or selection of characteristics of the insertion article;

a diameter of the inner body reference circle being less than a diameter of the inner aperture reference circle;

a diameter of the inner body reference circle being equal to a diameter of the inner aperture reference circle within a tolerance of +/−25, 20, 15, 10, 9, 8, 7, 6, 5, 4, 3, 2 or 1% of the diameter of the inner aperture reference circle;

a diameter of the outer body reference circle being less than a diameter of the outer aperture reference circle;

a diameter of the outer body reference circle being equal to a diameter of the outer aperture reference circle within a tolerance of +/−25, 20, 15, 10, 9, 8, 7, 6, 5, 4, 3, 2 or 1% of the diameter of the outer aperture reference circle;

the apertured article, the insertion article, or a combination thereof is configured to prevent relative rotation (e.g., to constrain the relative rotation to no more than 45, 40, 30, 35, 30, 25, 20, 15, 10, 9, 8, 7, 6, 5, 4, 3, 2 or 1 degree) of the apertured article relative to the insertion article when the aperture article, the insertion article or a combination thereof are rotated around an axis of rotation of the apertured article, an axis of rotation of the insertion article or a combination thereof, the apertured article, the insertion article, or a combination thereof is configured to prevent relative radial movement (e.g., to constrain the relative radial movement to no more than 20, 15, 10, 9, 8, 7, 6, 5, 4, 3, 2 or 1% of the radius of the inner aperture reference circle or the radius of the inner body reference circle) of the aperture axis relative to the insertion article axis;

the apertured article, the insertion article, or a combination thereof is configured to prevent relative longitudinal movement (e.g., to constrain the relative longitudinal movement to no more than 20, 15, 10, 9, 8, 7, 6, 5, 4, 3, 2 or 1% of a length of the apertured article as measured along the aperture axis, a length of the insertion article as measured along the body axis of the insertion article or both) of the insertion article relative to the aperture of the apertured article along the aperture axis of the apertured article, the body axis of the insertion article, or any combination thereof;

the insertion article being a connector that is configured to connect the apertured article and the additional insertion article, optionally the additional insertion article has a shape (e.g., exterior periphery) that does not mate with the apertured article, does mate with the insertion article, or any combination thereof, optionally the additional insertion article has a feature or any combination of features of the insertion article of any preceding clause; optionally the term mate comprises or means securely mate, fixedly mate, prevent relative longitudinal movement or slippage along an axis of rotation of the insertion article and/or additional insertion article, prevent relative longitudinal movement or slippage along an axis of the additional insertion article along which the additional insertion article is configured to be inserted into the insertion article, prevent relative longitudinal movement or slippage along an axis of the insertion article along which the insertion article is configured to receive the additional insertion article, or any combination thereof;

the exterior periphery of the insertion article is configured to mate with the article aperture of an apertured article (e.g., the apertured article of any preceding clause), optionally the insertion article comprises a body aperture (e.g., comprising any feature or combination of features of an aperture (e.g., the article aperture) of the apertured article of any preceding clause); optionally the insertion article is configured to connect an apertured article with an additional insertion article (e.g., article that can be inserted into the body aperture, article that mates with the body aperture, or any combination thereof);

the additional insertion article is configured to interact with, be coupled with or mate with the insertion article in any way that an insertion article can be configured to interact with, be coupled with or mate with the apertured article as described in this disclosure;

the system is configured so that the entire apertured article or at least a portion of the apertured article is rotatable around or configured to rotate around an article axis of rotation that passes through the article aperture;

the system comprising at least one other article, wherein the apertured article is configured to be modular or interchangeable with at least one other article in the system;

the insertion article is configured to be engaged with (e.g., be inserted into, be coupled with, mate with, be fixed to (e.g., relative fixed in a radial direction, along an axis of rotation, in a direction of rotation, or any combination thereof) or any combination thereof) the apertured article;

the insertion article configured to be engaged with the apertured article;

the insertion article comprises a body;

the body of the insertion article comprises a body exterior periphery, and the body exterior periphery comprises a body inner exterior periphery and spaced body protrusions that extend radially outwardly from the body inner exterior periphery to a body outer exterior periphery;

the body outer exterior periphery is defined by distal edges of the spaced body protrusions;

the body inner exterior periphery is positioned along the circumference of an inner body reference circle, and the body outer exterior periphery is positioned along the circumference of an outer body reference circle;

the system comprises a plurality of insertion articles comprising the insertion article, and the plurality of insertion articles comprises a first additional insertion article and/or a second additional insertion article; optionally the first additional insertion article optionally having a circular exterior cross-section and optionally configured to engage surfaces of the apertured article along the aperture inner periphery; optionally the second additional insertion article optionally having a polygonal exterior cross-section and optionally configured to engage surfaces of the apertured article along the aperture inner periphery;

the insertion article is a second apertured article, the second apertured article comprising a second article aperture; optionally the second article aperture comprises a second aperture periphery, and the second aperture periphery comprises a second aperture inner periphery and second spaced aperture protrusions that extend radially outwardly from the second aperture inner periphery to a second aperture outer periphery; optionally the second aperture outer periphery is defined by second distal edges of the second spaced aperture protrusions; optionally the second aperture inner periphery is positioned along the circumference of a second inner aperture reference circle, and optionally the second aperture outer periphery is positioned along the circumference of a second outer aperture reference circle;

the entire apertured article or at least a portion of the apertured article is configured to be rotatable around or to rotate around an article axis of rotation that passes through the article aperture;

the system comprising at least one other article, wherein the apertured article, the insertion article, or any combination thereof is configured to be modular or interchangeable with at least one other article in the system; or any combination thereof.

Although the apertured articles, insertion articles, and associated systems have been described above and in the drawings using illustrative shapes, the apertured articles, insertion articles and associated systems are not limited to these shapes. For example, the numbers of sides can change, the edges can be more or less rounded, or the shape can be more or less hexagonal or cylindrical.

Although embodiments of the invention have been described using the word "comprising," additional embodiments can be created by replacing the word "comprising" with "consisting essentially of" or "consisting of."

Although embodiments of the invention have been described using a first range with a first set of end points, additional embodiments can be created by replacing the first range with a narrower range whose endpoints are selected from any value contained in the first range.

Although embodiment of the invention have been described using a specific direction relative to a reference direction, additional embodiments can be created by indicating that specific direction can vary from the reference direction by no more than 45, 40, 35, 30, 25, 20, 15, 10, 9, 8, 7, 6, 5, 4, 3, 2 or 1 degrees.

Although embodiment of the invention have been described using a specific orientation or position relative to a reference orientation or position, additional embodiments can be created by indicating that specific orientation or position can vary from the reference orientation or position by no more than 45, 40, 35, 30, 25, 20, 15, 10, 9, 8, 7, 6, 5, 4, 3, 2 or 1 degrees for orientations or no more than 50, 45, 40, 35, 30, 25, 20, 15, 10, 9, 8, 7, 6, 5, 4, 3, 2 or 1% of a specified distance used to define the position relative to a reference position.

Although the invention hereof has been described by way of preferred embodiments, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. An assembly for rotating a wheel-shaped object comprising:
   the wheel-shaped object that comprises an aperture that includes an outer periphery coinciding with a first reference circle with a first radius and an inner periphery coinciding with a second reference circle with a second radius that is less than the first radius, wherein the inner periphery defines a plurality of inner peripheral surfaces forming elongated arcs that are concentric with the first reference circle and the second reference circle; and
   one or more insertion articles dimensioned to be inserted into the aperture, wherein the one or more insertion articles provides the assembly with an option of a live axle and a dead axle, and wherein:
   the one or more insertion articles includes a first shaft with a splined outer surface dimensioned to engage the outer periphery and the inner periphery of the aperture to provide the assembly with the live axle; and
   the one or more insertion articles includes a bearing comprising:
      an outer surface dimensioned to engage only the inner peripheral surfaces of the aperture, and
      a bore that is concentric with the first reference circle and the second reference circle and sized to receive a second shaft to provide the assembly with the dead axle.

2. The assembly of claim 1, wherein the first shaft is an elongated, hollow body formed from a side wall having a uniform thickness.

3. The assembly of claim 1, wherein the outer periphery and the inner periphery of the aperture is formed from a series of spaced protrusions extending radially inwardly from the first reference circle to the second reference circle.

4. The assembly of claim 1, wherein the bore has a hexagonal cross-sectional area.

5. The assembly of claim 1, wherein the wheel-shaped object is one of a wheel, a sprocket, and a gear.

6. A robot comprising:
   an assembly for rotating a wheel-shaped object that comprises:
      the wheel-shaped object that comprises an aperture that includes an outer periphery coinciding with a first reference circle with a first radius and an inner periphery coinciding with a second reference circle with a second radius that is less than the first radius, wherein the inner periphery defines a plurality of inner peripheral surfaces forming elongated arcs that are concentric with the first reference circle and the second reference circle; and
      one or more insertion articles dimensioned to be inserted into the aperture, wherein the one or more insertion articles provides the assembly with an option of a live axle and a dead axle, and wherein:
      the one or more insertion articles includes a first shaft with a splined outer surface dimensioned to engage the outer periphery and the inner periphery of the aperture to provide the assembly with the live axle; and
      the one or more insertion articles includes a bearing comprising:
         an outer surface dimensioned to engage only the inner peripheral surfaces of the aperture, and
         a bore that is concentric with the first reference circle and the second reference circle and sized to receive a second shaft to provide the assembly with the dead axle.

7. The robot of claim 6, wherein the first shaft is an elongated, hollow body formed from a side wall having a uniform thickness.

8. The robot of claim 6, wherein the outer periphery and the inner periphery of the aperture is formed from a series of spaced protrusions extending radially inwardly from the first reference circle to the second reference circle.

9. The robot of claim 6, wherein the bore has a hexagonal cross-sectional area.

10. The robot of claim 6, wherein the wheel-shaped object is one of a wheel, a sprocket, and a gear.

11. A method of assembling an assembly for rotating a wheel-shaped object, the method comprising:

obtaining the wheel-shaped object that comprises an aperture that includes an outer periphery coinciding with a first reference circle with a first radius and an inner periphery coinciding with a second reference circle with a second radius that is less than the first radius, wherein the inner periphery defines a plurality of inner peripheral surfaces forming elongated arcs that are concentric with the first reference circle and the second reference circle;

determining an axle type of the assembly;

obtaining an insertion article from one or more insertion articles based on the axle type of the assembly, wherein the insertion article is dimensioned to be inserted into the aperture;

responsive to determining that the assembly has a live axle, inserting a first shaft into the aperture of the wheel-shaped object, wherein the first shaft includes a splined outer surface dimensioned to engage the outer periphery and the inner periphery of the aperture of the wheel-shaped object; and responsive to determining that the assembly has a dead axle, inserting a bearing into the aperture of the wheel-shaped object, wherein the bearing includes:

an outer surface dimensioned to engage only the inner peripheral surfaces of the aperture, and a bore that is concentric with the first reference circle and the second reference circle and sized to receive a second shaft to provide the assembly with the dead axle.

12. The method of claim 11, wherein the first shaft is an elongated, hollow body formed from a side wall having a uniform thickness.

13. The method of claim 11, wherein the outer periphery and the inner periphery of the aperture is formed from a series of spaced protrusions extending radially inwardly from the first reference circle to the second reference circle.

14. The method of claim 11, wherein the bore has a hexagonal cross-sectional area and inserting the bearing into the aperture of the wheel-shaped object further includes inserting the second shaft into the bore.

15. The method of claim 11, wherein the wheel-shaped object is one of a wheel, a sprocket, and a gear.

\* \* \* \* \*